United States Patent
Totolos, Jr. et al.

(10) Patent No.: US 10,860,896 B2
(45) Date of Patent: Dec. 8, 2020

(54) FPGA DEVICE FOR IMAGE CLASSIFICATION

(71) Applicant: Uber Technologies, Inc., San Francisco, CA (US)

(72) Inventors: George Totolos, Jr., Cranberry Township, PA (US); Joshua Oren Silberman, Redwood City, CA (US); Daniel Leland Strother, Pittsburgh, PA (US); Carlos Vallespi-Gonzalez, Pittsburgh, PA (US); David Bruce Parlour, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/377,346

(22) Filed: Apr. 8, 2019

(65) Prior Publication Data

US 2019/0236414 A1    Aug. 1, 2019

Related U.S. Application Data

(62) Division of application No. 15/496,144, filed on Apr. 25, 2017, now Pat. No. 10,255,525.

(51) Int. Cl.
*G06K 9/62* (2006.01)
*G06T 7/70* (2017.01)
(Continued)

(52) U.S. Cl.
CPC .......... *G06K 9/6267* (2013.01); *B60W 10/06* (2013.01); *B60W 10/18* (2013.01); *B60W 10/20* (2013.01);
(Continued)

(58) Field of Classification Search
CPC ... G06T 2207/10016; G06T 1/20; G06T 7/13; G06T 7/70; G06T 7/11; G06T 7/75;
(Continued)

(56) References Cited

U.S. PATENT DOCUMENTS

| 6,337,692 B1 * | 1/2002 | Rai .................. G06T 5/008 345/589 |
| 6,542,111 B1 | 4/2003 | Wilson |

(Continued)

FOREIGN PATENT DOCUMENTS

| JP | 2006159939 | 6/2006 |
| WO | WO 2013155661 | 10/2013 |

OTHER PUBLICATIONS

Dollar et al., Fast Feature Pyramids for Object Detection, IEEE Transactions on Pattern Analysis and Machine Intelligence, vol. 36, Issue 8, Aug. 2014, pp. 1532-1545.

*Primary Examiner* — Jingge Wu
(74) *Attorney, Agent, or Firm* — Dority & Manning, PA

(57) ABSTRACT

Image processing systems can include one or more cameras configured to obtain image data, one or more memory devices configured to store a classification model that classifies image features within the image data as including or not including detected objects, and a field programmable gate array (FPGA) device coupled to the one or more cameras. The FPGA device is configured to implement one or more image processing pipelines for image transformation and object detection. The one or more image processing pipelines can generate a multi-scale image pyramid of multiple image samples having different scaling factors, identify and aggregate features within one or more of the multiple image samples having different scaling factors, access the classification model, provide the features as input (Continued)

to the classification model, and receive an output indicative of objects detected within the image data.

18 Claims, 9 Drawing Sheets

(51) Int. Cl.

| | | |
|---|---|---|
| *G06T 7/13* | (2017.01) | |
| *B60W 10/18* | (2012.01) | |
| *B60W 10/20* | (2006.01) | |
| *B60W 10/06* | (2006.01) | |
| *B60W 30/09* | (2012.01) | |
| *G06K 9/46* | (2006.01) | |
| *H04N 7/18* | (2006.01) | |
| *G06T 7/73* | (2017.01) | |
| *G06K 9/00* | (2006.01) | |
| *G06T 1/20* | (2006.01) | |
| *G05D 1/00* | (2006.01) | |

(52) U.S. Cl.
CPC ......... *B60W 30/09* (2013.01); *G06K 9/00805* (2013.01); *G06K 9/4609* (2013.01); *G06K 9/4642* (2013.01); *G06T 1/20* (2013.01); *G06T 7/13* (2017.01); *G06T 7/70* (2017.01); *G06T 7/73* (2017.01); *H04N 7/183* (2013.01); *H04N 7/188* (2013.01); *B60W 2420/42* (2013.01); *B60W 2420/52* (2013.01); *B60W 2710/0627* (2013.01); *B60W 2710/18* (2013.01); *B60W 2710/20* (2013.01); *G05D 1/0088* (2013.01); *G06T 2207/10016* (2013.01); *G06T 2207/10024* (2013.01); *G06T 2207/10028* (2013.01); *G06T 2207/20016* (2013.01); *G06T 2207/20076* (2013.01); *G06T 2207/20081* (2013.01); *G06T 2207/20084* (2013.01); *G06T 2207/30248* (2013.01)

(58) Field of Classification Search
CPC .......... G06K 9/00288; G06K 9/00248; G06K 9/00973; G06K 9/6267; G06K 9/3241; H04N 13/106; H04N 5/23267; B60W 10/18; B60W 10/06; B60W 10/20; B60W 30/09

See application file for complete search history.

(56) References Cited

U.S. PATENT DOCUMENTS

| | | |
|---|---|---|
| 6,795,031 B1 | 9/2004 | Walker et al. |
| 7,102,496 B1 | 9/2006 | Ernst, Jr. et al. |
| 7,124,027 B1 | 10/2006 | Ernst, Jr. et al. |
| 7,783,403 B2 | 8/2010 | Breed |
| 8,145,402 B2 | 3/2012 | Craig |
| 9,223,013 B2 | 12/2015 | Stein et al. |
| 9,330,321 B2 | 5/2016 | Schamp et al. |
| 9,672,446 B1 | 6/2017 | Vallespi-Gonzalez |
| 2003/0040944 A1 | 2/2003 | Hileman |
| 2006/0002586 A1 | 1/2006 | Aggarwal et al. |
| 2006/0208911 A1 | 9/2006 | Davis |
| 2008/0040004 A1 | 2/2008 | Breed |
| 2008/0129475 A1 | 6/2008 | Breed et al. |
| 2009/0010495 A1 | 1/2009 | Schamp et al. |
| 2009/0146813 A1 | 6/2009 | Nuno |
| 2009/0216600 A1 | 8/2009 | Hill |
| 2009/0316986 A1* | 12/2009 | Hua ..................... G06K 9/4647 382/170 |
| 2010/0165323 A1 | 7/2010 | Fiess |
| 2010/0194679 A1* | 8/2010 | Wu ..................... G06K 9/00375 345/156 |
| 2010/0201868 A1* | 8/2010 | Che ........................ H04N 5/142 348/448 |
| 2011/0249073 A1* | 10/2011 | Cranfill .................... G06F 9/451 348/14.02 |
| 2012/0147176 A1* | 6/2012 | Zhang ................ G06K 9/00805 348/118 |
| 2012/0147189 A1* | 6/2012 | Zhang ................ G06K 9/00791 348/149 |
| 2012/0155766 A1* | 6/2012 | Zhang ................ G06K 9/00664 382/173 |
| 2012/0158313 A1 | 6/2012 | Wang |
| 2012/0242492 A1 | 9/2012 | Grunfeld |
| 2014/0036054 A1* | 2/2014 | Zouridakis ........... A61B 5/0077 348/77 |
| 2014/0046585 A1 | 2/2014 | Morris et al. |
| 2014/0336842 A1 | 11/2014 | Jane et al. |
| 2015/0036942 A1* | 2/2015 | Smirnov .............. G06K 9/6282 382/227 |
| 2015/0210274 A1 | 7/2015 | Clarke et al. |
| 2015/0235073 A1* | 8/2015 | Hua ..................... G06K 9/00288 382/118 |
| 2015/0247733 A1 | 9/2015 | Horihata |
| 2015/0269733 A1* | 9/2015 | Kosaki ..................... G06K 9/74 382/107 |
| 2015/0331422 A1 | 11/2015 | Hartung et al. |
| 2016/0098619 A1* | 4/2016 | Gaidon ................ G06K 9/6212 382/159 |
| 2016/0132750 A1* | 5/2016 | Yang ....................... G06F 16/56 382/197 |
| 2016/0171285 A1* | 6/2016 | Kim ...................... G06K 9/00228 382/103 |
| 2016/0171331 A1* | 6/2016 | Csefalvay .......... G06K 9/00993 382/103 |
| 2016/0182874 A1* | 6/2016 | Richards ................ H04N 9/735 348/187 |
| 2016/0292836 A1* | 10/2016 | Perry .................. G06F 3/04845 |
| 2017/0339417 A1* | 11/2017 | Puri ..................... H04N 19/167 |
| 2018/0025235 A1* | 1/2018 | Fridman ................ G01C 21/28 382/103 |
| 2018/0075290 A1* | 3/2018 | Chen .................. G06K 9/00228 |
| 2018/0075599 A1* | 3/2018 | Tajbakhsh ............. G06T 7/0012 |
| 2018/0075602 A1* | 3/2018 | Shen ......................... G06T 7/50 |
| 2018/0129906 A1* | 5/2018 | Habibian ............. G06K 9/4628 |
| 2018/0232471 A1* | 8/2018 | Schissler .................. G06F 30/20 |
| 2018/0374213 A1* | 12/2018 | Arnold ................ G06T 7/0012 |
| 2019/0236411 A1* | 8/2019 | Zhu ...................... G06K 9/4628 |
| 2019/0258897 A1* | 8/2019 | Cao .......................... G06K 9/42 |

* cited by examiner

FPGA DEVICE FOR IMAGE CLASSIFICATION

PRIORITY CLAIM

The present application claims priority to and is a divisional of U.S. application Ser. No. 15/496,144 having a filing date of Apr. 25, 2017, which is incorporated by reference herein.

FIELD

The present disclosure relates generally to detecting objects of interest. More particularly, the present disclosure relates to detecting and classifying objects that are proximate to an autonomous vehicle in part by using a field programmable gate array (FPGA)-based image processor.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

Thus, a key objective associated with an autonomous vehicle is the ability to perceive objects (e.g., vehicles, pedestrians, cyclists) that are proximate to the autonomous vehicle and, further, to determine classifications of such objects as well as their locations. The ability to accurately and precisely detect and characterize objects of interest is fundamental to enabling the autonomous vehicle to generate an appropriate motion plan through its surrounding environment.

SUMMARY

Aspects and advantages of embodiments of the present disclosure will be set forth in part in the following description, or can be learned from the description, or can be learned through practice of the embodiments.

One example aspect of the present disclosure is directed to an image processing system. The image processing system includes one or more cameras configured to obtain image data. The image processing system also includes one or more memory devices configured to store a classification model that classifies image features within the image data as including or not including detected objects. The image processing system also includes a field programmable gate array (FPGA) device coupled to the one or more cameras. The FPGA device is configured to implement one or more image processing pipelines for image transformation and object detection. The one or more image processing pipelines include a plurality of logic blocks and interconnectors programmed to: generate a multi-scale image pyramid of multiple image samples having different scaling factors; identify and aggregate features within one or more of the multiple image samples having different scaling factors; access the classification model stored in the one or more memory devices; provide the features within the one or more of the multiple image samples as input to the classification model; and produce an output indicative of objects detected within the image data.

Another example aspect of the present disclosure is directed to a vehicle control system. The vehicle control system includes one or more cameras configured to obtain image data within an environment proximate to a vehicle. The vehicle control system also includes a field programmable gate array (FPGA) device coupled to the one or more image sensors, the FPGA device configured to implement one or more image processing pipelines for image transformation and object detection. The one or more image processing pipelines include a plurality of logic blocks and interconnectors programmed to: generate a multi-scale image pyramid of multiple image samples having different scaling factors; identify and aggregate features within one or more of the multiple image samples having different scaling factors; and to detect objects of interest within the multiple image samples based at least in part on the features. The vehicle control system also includes one or more computing devices configured to receive an output from the FPGA device and to further characterize the objects of interest.

Another example aspect of the present disclosure is directed to a method of detecting objects of interest. The method includes receiving, by one or more programmable circuit devices, image data from one or more cameras. The method also includes generating, by the one or more programmable circuit devices, a multi-scale image pyramid of multiple image samples having different scaling factors. The method also includes analyzing, by the one or more programmable circuit devices, successive image patches within each of the multiple image samples using a sliding window of fixed size. The method also includes pooling, by the one or more programmable circuit devices, image patches associated by like features into image regions within each of the multiple image samples. The method also includes accessing, by the one or more programmable circuit devices, a classification model that classifies image regions as including or not including detected objects. The method also includes providing, by the one or more programmable circuit devices, the image regions as input to the classification model. The method also includes receiving, by the one or more programmable circuit devices, an output of the classification model corresponding to detected objects of interest within the image data.

Other aspects of the present disclosure are directed to various systems (e.g., computing systems, vehicle systems, image processing systems), apparatuses (e.g., vehicles, computing devices, image processors), non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
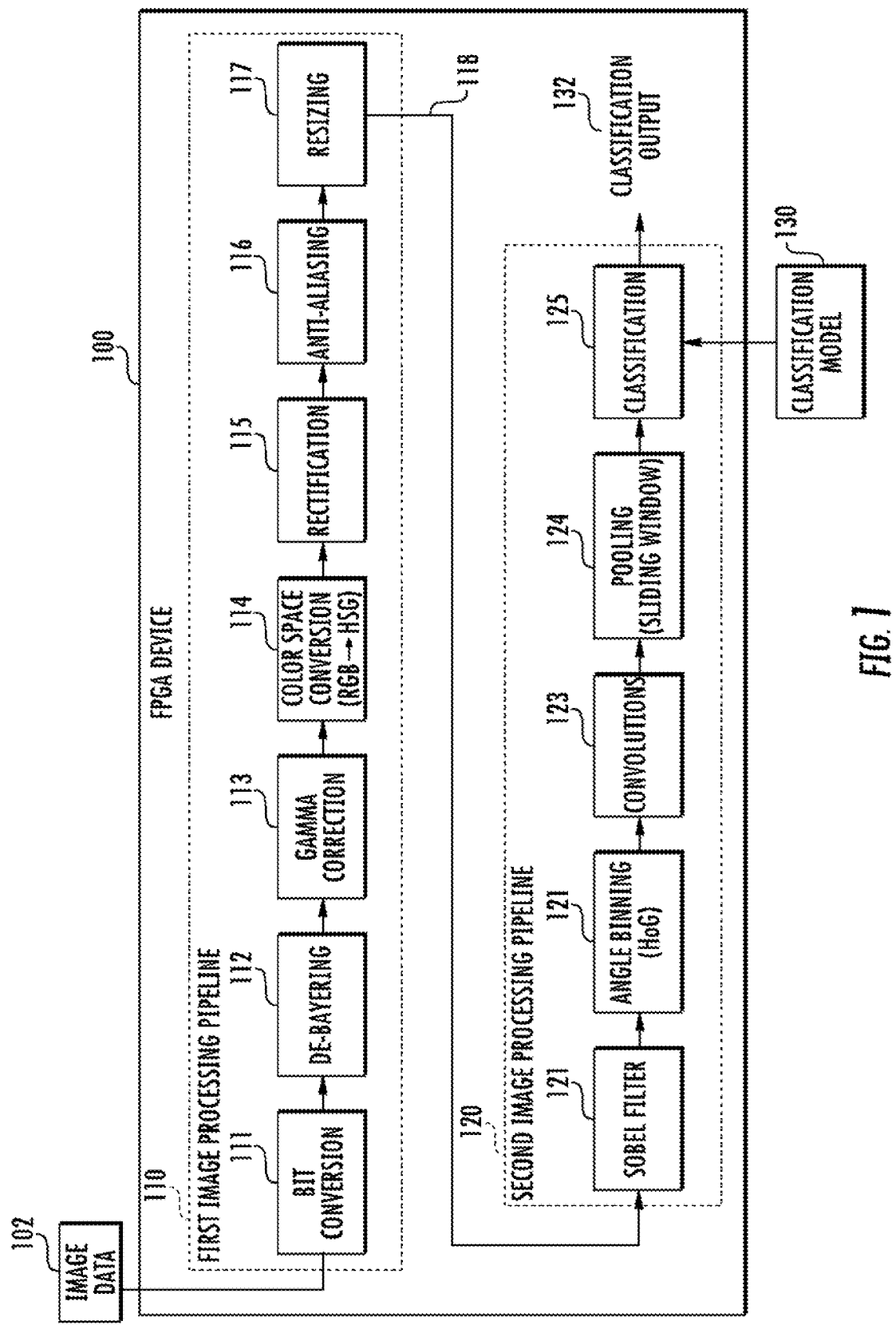
FIG. 1 depicts a block diagram of an example programmable circuit device (e.g., FPGA device) according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are generally directed to image classification technology for vehicle applications. Classification of images in vehicle applications, especially for purposes of object detection, can require a substantial amount of processing power and analytical precision to yield effective and accurate results. The disclosed image classification techniques can provide substantial improvements to that end by utilizing one or more cameras in conjunction with a field programmable gate array (FPGA) device. Image classification by the FPGA device can generally include a one or more processing portions directed to image transformation and/or object detection. Image transformation can include generating a multi-scale image pyramid of image samples characterized by multi-parameter integer-based representations that can be more easily handled by an FPGA device and that can result in more accurate object detection. Image processing with an FPGA device corresponding to a single programmable chip coupled to the one or more cameras helps to greatly improve the processing speed for feature extraction, object detection and/or other image processing aspects as disclosed herein. Utilization of an FPGA device provides system functionality to perform a vast number of image processing operations in parallel including multi-scale image analysis as opposed to the linear functionality afforded by conventional processor-based computing devices that implement one set of instructions at a time.

More particularly, an image processing system in accordance with example embodiments of the disclosed technology can include one or more cameras configured to obtain image data. In some examples, the cameras can respectively include one or more initial filters, a lens selectively configured to focus on one or more regions of interest, a shutter selectively controlled between open and closed positions in accordance with one or more exposure protocols (e.g., a global shutter exposure protocol), a color filter array, an image sensor, and the like. Each image sensor can include a charge-coupled device (CCD) sensor and/or a complementary metal-oxide-semiconductor (CMOS) sensor, although other image sensors can also be employed. Each camera can include an array of image sensor elements configured to detect incoming light provided incident to a surface of the camera and convert the received amount of light into a corresponding electric signal. The electric signal captured at each image sensor element can provide image data at a plurality of pixels, each pixel corresponding to a corresponding image sensor element within a camera.

An image processing system in accordance with the disclosed technology can more particularly include one or more programmable circuit devices such as a field programmable gate array (FPGA) device. In some examples, the one or more cameras can be coupled directly to the FPGA device via one or more image interface protocols (e.g., Low-Voltage Differential Signaling (LVDS)). The FPGA device or other programmable circuit device can include a plurality of logic blocks and interconnectors that can be programmed into specific configurations for implementing various operations. In some implementations, such various operations can include one or more image processing pipelines. In some examples, such various operations can include a first image processing pipeline for image transformation and a second image processing pipeline for object detection. The image transformation and object detection pipelines can result in generation and classification of multiple different image variations simultaneously because the pipelines are implemented using an FPGA device as opposed to conventional processor-based computing devices. Although some FPGA device examples are described herein as including separate first and second image processing pipelines, it should be appreciated that other implementations could include all features in a single image processing pipeline or features split across different combinations of pipelines than those explicitly depicted and discussed.

In some example implementations, the first image processing pipeline for image transformation can more particularly include a plurality of logic blocks and interconnectors programmed to implement one or more transformation techniques including De-Bayering, gamma correction, rectification, anti-aliasing, etc.

In some implementations, the first image processing pipeline for image transformation can more particularly include a plurality of logic blocks and interconnectors designed to convert intermediate stages of image data from a floating point representation to fixed point integer-based representation. In some examples, converting image data to an integer-based representation can include resizing image data size values characterized by a first number of bits to image data size values characterized by a second number of bits. In some implementations, the second number of bits can be different and smaller than the first number of bits. In some implementations, each bit in the first number of bits can be analyzed using a technique such as a histogram to determine which bits in the first number of bits is more important to the image data. The histogram or other technique can then be used to help determine which bits in the second number of bits are kept from the first number of bits and which bits or discarded or otherwise modified.

In some implementations, the first image processing pipeline for image transformation can more particularly include a plurality of logic blocks and interconnectors programmed to convert image data from a representation having multiple color components into a greyscale representation. In some examples, such image transformation can more particularly correspond to converting image data into a multi-parameter (HSG) representation corresponding to values for an image hue (H) parameter, an image saturation (S) parameter, and an image greyscale (G) parameter.

In some implementations, the first image processing pipeline for image transformation can more particularly include a plurality of logic blocks and interconnectors programmed to resize the image data obtained by the one or more cameras. In some implementations, for example, image resizing can include downsampling the image data into a multi-scale image pyramid. The multi-scale image pyramid can include image data that is translated into multiple image samples having different scaling factors. In some implementations, the multi-scale image pyramid can be characterized by a number of octaves (e.g., powers of two) and a number of scales per octave. Some or all of the image samples generated by the first image processing pipeline can then be provided as input to the second image processing pipeline for object detection.

In some implementations, for example, the second image processing pipeline for object detection can more particularly include a plurality of logic blocks and interconnectors programmed to identify and aggregate features within one or more of the multiple image samples within a multi-scale image pyramid. The second image processing pipeline can also access a classification model, for example a classification model that is stored in one or more memory devices (e.g., DRAM) accessible by the programmable circuit device (e.g., FPGA). The classification model can be configured to classify image portions and/or image features as including or not including detected objects.

The features identified and aggregated from the image samples can be provided as input to the classification model. An output then can be received from the classification model corresponding to objects detected within the image data (e.g., vehicles, cyclists, pedestrians, traffic control devices, etc.) In some examples, the output from the classification model can include an indication of whether image features include or do not include detected objects. For features that include detected objects, the classification model can include a classification for a detected object as one or more objects from a predetermined set of objects. In some examples, the classification model can also output a probability score associated with the classification, the probability score being indicative of a probability or likelihood of accuracy for the classification. In some implementations, the classification model can include a decision tree classifier. In some implementations, the classification model is a machine-learned model such as but not limited to a model trained as a neural network, a support-vector machine (SVM) or other machine learning process.

In some implementations, for example, the second image processing pipeline for object detection can more particularly include a plurality of logic blocks and interconnectors programmed to identify and aggregate edge portions within some or all of the image samples in the multi-scale image pyramid. In some examples, the object detection pipeline is further configured to implement an angle binning algorithm that determines an angle classification for each of the identified edge portions and assigns each edge portion to one of a plurality of different bins based at least in part on the angle classification determined for that edge portion. A histogram, such as but not limited to a histogram of oriented gradients, descriptive of the plurality of different bins can be generated. In some examples, the plurality of different bins can be defined to have different sizes based on the amount of image data in each image sample such that bin sizes are smaller for image samples having a greater amount of image data.

In some implementations, for example, the second image processing pipeline for object detection can more particularly include a plurality of logic blocks and interconnectors programmed to generate one or more channel images from the image data, each channel image corresponding to a feature map that maps a patch of one or more input pixels from the image data to an output pixel within the channel image.

In some implementations, for example, the second image processing pipeline for object detection can more particularly include a plurality of logic blocks and interconnectors programmed to determine a sliding window of fixed size, analyze successive image patches within each of the multiple image samples using the sliding window of fixed size, and identify objects of interest within the successive image patches. In some examples, image patches can be pooled into image regions associated by like features within each of the multiple image samples. Pooled image regions can be identified by boxes or other bounding shapes identified within an image. In some examples, the pooled image regions can be provided as an input to the classification model, which then generates an output corresponding to detected objects of interest within the image regions.

In some examples, one or more outputs from the classification model and/or some or all of the image data including one or more image variations can be provided as output data to one or more computing devices in a vehicle control system. The vehicle control system can control an operational parameter of a vehicle (e.g., speed, direction, etc.) in response to detection of at least one object of interest in the image data. In this manner, a vehicle can turn and/or stop upon conditions being detected within the image data, including but not limited to the approach of another vehicle, a pedestrian crossing the road, a red traffic light being detected at an intersection, and the like. The one or more computing devices can include a perception system, a prediction system, and a motion planning system that cooperate to perceive the surrounding environment of a vehicle and determine a motion plan for controlling the motion of the vehicle accordingly.

In some examples, a vehicle control system configured to analyze image data and/or classification outputs from a disclosed image processing system can be provided as an integrated component in an autonomous vehicle. The autonomous vehicle can be configured to operate in one or more modes, for example, a fully autonomous operational mode and/or a semi-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

In particular, in some implementations, the perception system can receive image data and/or image classification information from the disclosed image processing system as well as sensor data from one or more additional sensors. Additional sensors can include, for example, a ranging system such as but not limited to a Light Detection and Ranging (LIDAR) system and/or a Radio Detection and Ranging (RADAR) system. The image data, image classification information and sensor data can be collectively analyzed to determine the location (e.g., in three-dimensional space relative to the autonomous vehicle) of points that correspond to objects within the surrounding environment of the autonomous vehicle (e.g., at one or more times).

The perception system can identify one or more objects that are proximate to the autonomous vehicle based on some or all of the image data, image classification information and sensor data. In particular, in some implementations, the perception system can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class of characterization (e.g., vehicle versus pedestrian versus bicycle versus other); yaw rate; and/or other state information. In some implementations, the perception system can determine state data for each object over a number of iterations. In particular, the perception system can update the state data for each object at each iteration. Thus, the perception system can detect and track objects (e.g., vehicles, bicycles, pedestrians, etc.) that are proximate to the autonomous vehicle over time.

The prediction system can receive the state data from the perception system and predict one or more future locations for each object based on such state data. For example, the prediction system can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system can determine a motion plan for the autonomous vehicle based at least in part on predicted one or more future locations for the object and/or the state data for the object provided by the perception system. Stated differently, given information about the current locations of objects and/or predicted future locations of proximate objects, the motion planning system can determine a motion plan for the autonomous vehicle that best navigates the autonomous vehicle along the determined travel route relative to the objects at such locations.

As one example, in some implementations, the motion planning system can determine a cost function for each of one or more candidate motion plans for the autonomous vehicle based at least in part on the current locations and/or predicted future locations of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

Thus, given information about the current locations and/or predicted future locations of objects, the motion planning system can determine a cost of adhering to a particular candidate pathway. The motion planning system can select or determine a motion plan for the autonomous vehicle based at least in part on the cost function(s). For example, the motion plan that minimizes the cost function can be selected or otherwise determined. The motion planning system then can provide the selected motion plan to a vehicle controller that controls one or more vehicle controls (e.g., actuators or other devices that control gas flow, steering, braking, etc.) to execute the selected motion plan.

The systems and methods described herein may provide a number of technical effects and benefits. For instance, image processing systems and methods that implement image transformation and object detection using an FPGA device (or ASIC device) coupled to one or more cameras can generally provide faster image processing speed and reduce potential processing latencies. Image processing with an FPGA device corresponding to a single programmable chip coupled to the one or more cameras helps to greatly improve the processing speed for feature extraction, object detection and/or other image processing aspects as disclosed herein. High-throughput on-chip memories and data pipelining associated with FPGA device implementation allows for image processing to occur in parallel to images being read out from an image sensor, thus making the disclosed image processing systems and methods uniquely capable of real-time or near real-time object detection at fast enough speeds to advantageously affect the behavior of an autonomous vehicle.

More particularly, utilization of an FPGA device can provide system functionality to perform a vast number of image processing operations (e.g., on the order of thousands of processing operations or more) in parallel including multi-scale image analysis as opposed to the linear functionality afforded by conventional processor-based computing devices that implement one set of instructions at a time. In some implementations, the number of image frames per second analyzed by an FPGA-based image processor can be on the order of 5-10 times more than a conventional processor-based image processor. The improved image processing capacity afforded by coupling an FPGA device with one or more cameras can help achieve a level of image processing functionality that was otherwise unachievable with micro-processor functionality in conventional computing devices.

The systems and methods described herein may provide an additional technical effect and benefit of improved accuracy in object detection by providing techniques for actual implementation of higher quality and more comprehensive algorithms for object detection. For example, by transforming initially obtained image data into multiple different variations (e.g., different image samples in a multi-scale image pyramid and/or multiple different channel images generated from original image data), parallel processing on the image variations can provide more comprehensive image analysis. The likelihood of detecting objects within image regions or other image portions in an effective and timely manner can thus be significantly enhanced.

The systems and methods described herein may provide an additional technical effect and benefit of improved accuracy in object detection by providing image transformation techniques implemented by an FPGA-processing pipeline that yield image enhancements that ultimately improves object detection. For instance, combined use of one or more transformation techniques including gamma correction, rectification, and/or anti-aliasing can help result in the generation of a multi-scale image pyramid whose image data characteristics are better maintained across the different scales of image samples. Conversion of image data from a representation having multiple color components into a greyscale representation (e.g., a multi-parameter representation corresponding to (HSG) values for an image hue (H) parameter, an image saturation (S) parameter, and an image greyscale (G) parameter, can result in an image form better suited for object detection in vehicle applications. Still further transformation techniques such as Sobel filtering can help to improve the identification of certain image features (e.g., detection of edge portions) within the different image samples or channel images. The specific types of image transformation techniques implemented using FPGA technology combine to provide enhanced image classification.

The disclosed improvements to image processing can be particularly advantageous for use in conjunction with vehicle computing systems for autonomous vehicles. Because vehicle computing systems for autonomous vehicles are tasked with repeatedly detecting and analyzing objects in image data for localization and classification of objects of interest including other vehicles, cyclists, pedestrians, traffic changes, and the like, and then determining necessary responses to such objects of interest, enhanced image processing can lead to faster and more accurate object detection and characterization. Improved object detection and classification can have a direct effect on the provision of safer and smoother automated control of vehicle systems and improved overall performance of autonomous vehicles.

The systems and methods described herein may also provide resulting improvements to computing technology tasked with image classification and object detection. Improvements in the speed and accuracy of object detection can directly improve operational speed and reduce processing requirements for vehicle computing systems, ultimately resulting in more efficient vehicle control. By providing an image processing system that includes an FPGA device (or ASIC device) configured to implement image transformation and object detection, valuable computing resources within a vehicle control system that would have otherwise been needed for such tasks can be reserved for other tasks such as object prediction, route determination, autonomous vehicle control, and the like.

With reference to the figures, example embodiments of the present disclosure will be discussed in further detail. FIG. 1 depicts a block diagram of an example programmable circuit device (e.g., FPGA device 100) according to example embodiments of the disclosed technology. Image data 102, such as captured by an image sensor within one or more cameras can be provided as input to the FPGA device 100. Data link(s) for providing image data 102 can operate using different signaling protocols, including but not limited to a Low-Voltage Differential Signaling (LVDS) protocol, a lower voltage sub-LVDS protocol, a Camera Serial Interface (CSI) protocol using D-PHY and/or M-PHY physical layers, or other suitable protocols and interface layers. The FPGA device 100 can be provided as an integral part of a camera or a separate component interfaced with one or more cameras. Additional description of a camera for obtaining image data 102 is provided in FIG. 6.

FPGA device 100 can include a plurality of logic blocks and interconnectors that can be programmed into specific configurations for implementing various operations. In some implementations, such various operations can include one or more image processing pipelines. In some examples, such various operations can include a first image processing pipeline 110 for image transformation and a second image processing pipeline 120 for object detection. The first and second image processing pipelines 110, 120 can result in generation and classification of multiple different image variations simultaneously because the pipelines are implemented using FPGA device 100 as opposed to conventional processor-based computing devices. Although FPGA device 100 is described herein as including various components as part of a respective first image processing pipeline 110 and second image processing pipeline 120, it should be appreciated that an FPGA device 100 can alternatively implement a combination of components from such pipelines into a single pipeline or multiple different pipelines (e.g., two or more in different combinations than described herein).

In some example implementations, the first image processing pipeline 110 for image transformation can more particularly include a plurality of logic blocks and interconnectors programmed to implement one or more transformation components including a bit conversion component 111, a de-Bayering component 112, a gamma correction component 113, a color space conversion component 114, rectification component 115, an anti-aliasing component 116, and a resizing component 117. Although multiple components are described as part of the first image processing pipeline 110, it should be appreciated that embodiments of the disclosed technology need not include all such components. As such, some of the components within first image processing pipeline 110 can be optional to accommodate selective customization of image transformation features.

Referring more particularly to the bit conversion component 111, a plurality of logic blocks and interconnectors within FPGA device 100 can be programmed to convert intermediate stages of the image data 102 from a floating point representation to fixed point integer-based representation. In some examples, converting intermediate stages of the image data 102 to an integer-based representation can include resizing image data values characterized by a first number of bits to image data values characterized by a second number of bits. In some implementations, the second number of bits can be different and smaller than the first number of bits. In some implementations, each bit in the first number of bits can be analyzed using a technique such as a histogram to determine which bits in the first number of bits is more important to the image data (e.g., which bits convey image data that is more likely to include objects of interest within an image). The histogram or other technique can then be used to help determine which bits in the second number of bits are kept from the first number of bits and which bits or discarded or otherwise modified.

Referring more particularly to the de-Bayering component 112, a plurality of logic blocks and interconnectors within FPGA device 100 can be programmed to convert image data that has been received through a color filter array into a data format that includes multiple color components per pixel. For example, an array of image sensor elements (e.g., corresponding to respective pixels) can be positioned relative to a color filter array having one or more different color filter elements. The particular arrangement of color filter elements can vary. For example, some color filter elements can be red, blue, green, and/or clear/white. De-Bayering component 112 can be configured to receive light of a particular color at each image sensor element, and then reconstruct a full color image by interpolating values for multiple color components at each image sensor element or pixel within the image data.

Referring more particularly to the gamma correction component 113, a plurality of logic blocks and interconnectors within FPGA device 100 can be programmed to implement a nonlinear contrast adjustment to image data 102.

Gamma correction component 113 can be configured to ultimately control the brightness within image data in a manner that provides enhanced distinction among captured image features to facilitate better object detection.

Referring more particularly to the color space conversion component 114, a plurality of logic blocks and interconnectors within FPGA device 100 can be programmed to convert image data 102 from a representation having multiple color components into a greyscale representation. In some examples, such image transformation can more particularly correspond to converting image data into a multi-parameter (HSG) representation corresponding to values for an image hue (H) parameter, an image saturation (S) parameter, and an image greyscale (G) parameter. The image hue (H) parameter can be representative of the light property for image data that characterizes how color is classified as one of multiple color parameters (e.g., red, green, blue, white, yellow, etc.) relative to one or more respective pure reference values for each color parameter in the color spectrum. The image saturation (S) parameter can be representative of the light property for image data that characterizes the intensity of color within the image relative to brightness. The image greyscale (G) parameter can be representative of the light property for image data that characterizes the intensity of monochrome light for each pixel within an image. The use of multi-parameter HSG representations for image data 102 provides an enhanced image data format that has proven to be beneficial for image-based object detection applications. These benefits are achieved in part by the type of image information captured using the hue, saturation and greyscale parameters.

Referring more particularly to the rectification component 115, a plurality of logic blocks and interconnectors within FPGA device 100 can be programmed to implement an alignment transformation that shifts image data 102 to positions within a reference system (e.g., another image, a map of area surrounding a vehicle, and/or a reference grid of points defining three-dimensional space surrounding a vehicle).

Referring more particularly to the anti-aliasing component 116, a plurality of logic blocks and interconnectors within FPGA device 100 can be programmed to implement an image filter that splits respective optical points (e.g., image data pixels) into a cluster of points. This anti-aliasing component 116 can help ensure a proper sampling of image data 102 before the image data is resized into multiple samples via resizing component 117.

Referring more particularly to the resizing component 117, a plurality of logic blocks and interconnectors within FPGA device 100 can be programmed to resize the image data 102 obtained by the one or more cameras. In some implementations, for example, image resizing at resizing component 117 can include downsampling the image data 102 into a multi-scale image pyramid. The multi-scale image pyramid can include image data that is translated into multiple image samples 118 having different scaling factors. In some implementations, the multi-scale image pyramid can be characterized by a number of octaves (e.g., powers of two) and a number of scales per octave.

Referring still to FIG. 1, some or all of the image samples 118 generated by the first image processing pipeline 110 can then be provided as input to the second image processing pipeline 120 for object detection. In some example implementations, the second image processing pipeline 120 for image transformation can more particularly include a plurality of logic blocks and interconnectors programmed to implement one or more components including a Sobel filter component 121, an angle binning component 122, a convolution component 123, a pooling component 124, and a classification component 125. Although multiple components are described as part of the second image processing pipeline 120, it should be appreciated that embodiments of the disclosed technology need not include all such components. As such, some of the components within second image processing pipeline 120 can be optional to accommodate selective customization of image transformation features.

Referring more particularly to the Sobel filter component 121, a plurality of logic blocks and interconnectors within FPGA device 100 can be programmed to identify and enhance directional changes in the light intensity between adjacent pixels or other designated portions of each image sample 118. For each image point, these directional changes can be represented by a horizontal derivative representing changes in image intensity in the horizontal direction and a vertical derivative representing changes in image intensity in the vertical direction. In some implementations, the output of Sobel filter component 121 is an image sample 118 having enhanced edges resulting from a modification of the image data within each image sample 118 based at least in part on the determined horizontal and vertical derivatives at each image point.

Referring more particularly to the angle binning component 122, a plurality of logic blocks and interconnectors within FPGA device 100 can be programmed to implement an angle binning algorithm that characterizes the directional changes in image intensity determined within the Sobel filter component 121. In some implementations, angle binning component 122 is configured to determine a spatial gradient magnitude for image points within each image sample based at least in part on the horizontal and vertical derivatives determined by Sobel filter component 121. In some implementations, angle binning component 122 is further configured to characterize the spatial gradient magnitudes on a per point/pixel basis within each image sample. In other implementations, spatial gradient measurements can be characterized on a per feature basis within each sample, where each feature is part of a channel image feature map that maps a patch of one or more input pixels from image data to an output pixel within the channel image feature map.

More particularly, in some examples, the angle binning component 122 is configured to determine an angle classification for each of the identified image components (e.g., pixels, features and/or edge portions) and assigns each image component to one of a plurality of different bins based at least in part on the angle classification determined for that image component. A histogram, such as but not limited to a histogram of oriented gradients, descriptive of the plurality of different bins within angle binning component 122 can be generated. In some examples, the plurality of different bins can be defined to have different sizes based on the amount of image data in each image component such that bin sizes are smaller for image components having a greater amount of image data.

Referring more particularly to the convolution component 123, a plurality of logic blocks and interconnectors within FPGA device 100 can be programmed to filter image samples 118 using one or more convolution matrices to sharpen and enhance edges within each image sample. In some implementations, convolution component utilizes a plurality of convolution matrices, for example on the order of between about 4 matrices and about 20 matrices, each matrix having N×N integer values, with the matrix size value N being between about 3 and 6.

Referring more particularly to the pooling component 124, a plurality of logic blocks and interconnectors within FPGA device 100 can be programmed to determine a sliding window of fixed size, analyze successive image patches within each of the multiple image samples 118 using the sliding window of fixed size, and identify objects of interest within the successive image patches. In some examples, image patches can be pooled into image regions associated by like features within each of the multiple image samples. Pooled image regions can be identified by boxes or other bounding shapes identified within an image. In some examples, the pooled image regions can be provided as an input to the classification component 125, which then generates an output corresponding to detected objects of interest within the image regions.

Referring more particularly to the classification component 125, the FPGA device 100 can be configured to access a classification model 130 that is configured to classify image portions and/or image features as including or not including detected objects. In some implementations, classification model 130 can be stored in one or more memory devices (e.g., DRAM) accessible by FPGA device 100. In some implementations, the classification model 130 can include a decision tree classifier or other supervised learning model. In some implementations, the classification model 130 can be a machine-learned model such as but not limited to a model trained as a neural network, a support-vector machine (SVM) or other machine learning process.

More particularly, the classification component 125 can be configured to provide the image regions from pooling component 124 as input to the classification model 130. A classification output 132 then can be received from the classification model 130 corresponding to objects detected within the image data. In some examples, the classification output 132 from classification model 130 can include an indication of whether image regions include or do not include one or more objects. For image regions that include detected objects, the classification output 132 from classification model 130 can include a classification for a detected object as one or more classes from a predetermined set (e.g., vehicles, cyclists, pedestrians, traffic control devices, etc.). In some examples, the classification output 132 from classification model 130 can also include a probability score associated with the classification. For example, the probability score can be indicative of a probability or likelihood of accuracy for the classification (e.g., a likelihood that an object is or is not detected, or a likelihood that a classification for an object (e.g., as a pedestrian, bicycle, vehicle, etc.) is correct.

Figure 2:
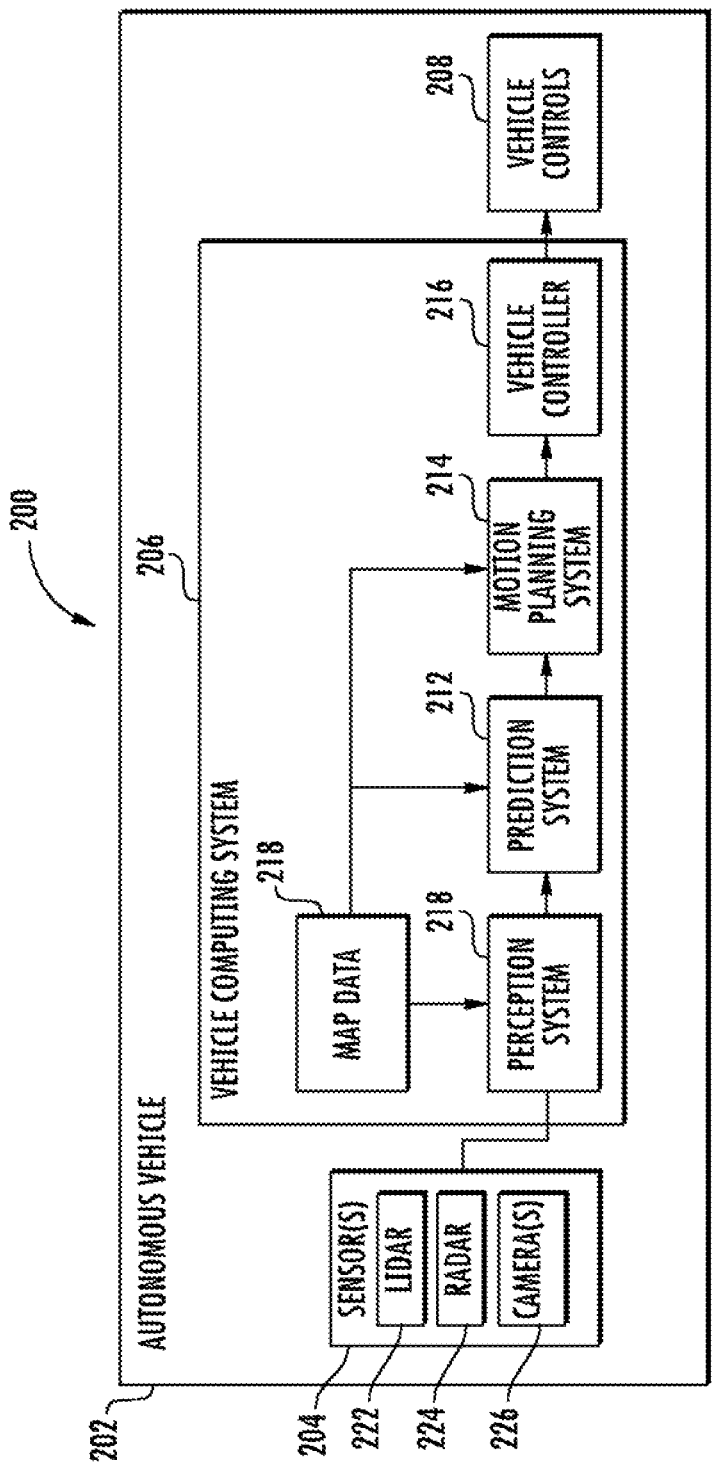
FIG. 2 depicts a block diagram of an example vehicle control system according to example embodiments of the present disclosure.

FIG. 2 depicts a block diagram of an example vehicle control system according to example embodiments of the present disclosure. More particularly, a vehicle control system 200 can be included within or otherwise associated with an autonomous vehicle 202. The autonomous vehicle 202 is capable of sensing its environment and navigating without human input. The autonomous vehicle 202 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 202 can be configured to operate in one or more modes, for example, a fully autonomous operational mode and/or a semi-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

The autonomous vehicle 202 can include one or more sensors 204, a vehicle computing system 206, and one or more vehicle controls 208. The vehicle computing system 206 can include one or more computing devices configured to assist in controlling the autonomous vehicle 202. In particular, the vehicle computing system 206 can receive sensor data from the one or more sensors 204, attempt to comprehend the surrounding environment by performing various processing techniques on data collected by the sensors 204, and generate an appropriate motion path through such surrounding environment. The vehicle computing system 206 can control the one or more vehicle controls 208 to operate the autonomous vehicle 202 according to the motion path.

As illustrated in FIG. 2, in some embodiments, the vehicle computing system 206 can include a perception system 210, a prediction system 212, and a motion planning system 214 that cooperate to perceive the surrounding environment of the autonomous vehicle 202 and determine a motion plan for controlling the motion of the autonomous vehicle 202 accordingly.

In particular, in some implementations, the perception system 210 can receive sensor data from the one or more sensors 204 that are coupled to or otherwise included within the autonomous vehicle 202. As examples, the one or more sensors 204 can include a Light Detection and Ranging (LIDAR) system 222, a Radio Detection and Ranging (RADAR) system 224, one or more cameras 226 (e.g., visible spectrum cameras, infrared cameras, etc.), and/or other sensors. The sensor data can include information that describes the location of objects within the surrounding environment of the autonomous vehicle 202.

As one example, for LIDAR system 222, the sensor data can include the location (e.g., in three-dimensional space relative to the LIDAR system 222) of a number of points that correspond to objects that have reflected a ranging laser. For example, LIDAR system 222 can measure distances by measuring the Time of Flight (TOF) that it takes a short laser pulse to travel from the sensor to an object and back, calculating the distance from the known speed of light.

As another example, for RADAR system 224, the sensor data can include the location (e.g., in three-dimensional space relative to RADAR system 224) of a number of points that correspond to objects that have reflected a ranging radio wave. For example, radio waves (pulsed or continuous) transmitted by the RADAR system 224 can reflect off an object and return to a receiver of the RADAR system 224, giving information about the object's location and speed. Thus, RADAR system 224 can provide useful information about the current speed of an object.

As yet another example, for one or more cameras 226, various processing techniques can be performed to identify the location (e.g., in three-dimensional space relative to the one or more cameras 226) of a number of points that correspond to objects that are depicted in imagery captured by the one or more cameras 226.

Thus, the one or more sensors 204 can be used to collect sensor data that includes information that describes the location (e.g., in three-dimensional space relative to the autonomous vehicle 202) of points that correspond to objects within the surrounding environment of the autonomous vehicle 202.

In addition to the sensor data, the perception system 210 can retrieve or otherwise obtain map data 218 that provides detailed information about the surrounding environment of the autonomous vehicle 202. The map data 218 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 206 in comprehending and perceiving its surrounding environment and its relationship thereto.

The perception system 210 can identify one or more objects that are proximate to the autonomous vehicle 202 based on sensor data received from the one or more sensors 204 and/or the map data 218. In particular, in some implementations, the perception system 210 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 210 can determine state data for each object over a number of iterations. In particular, the perception system 210 can update the state data for each object at each iteration. Thus, the perception system 210 can detect and track objects (e.g., vehicles, pedestrians, bicycles, and the like) that are proximate to the autonomous vehicle 202 over time.

The prediction system 212 can receive the state data from the perception system 210 and predict one or more future locations for each object based on such state data. For example, the prediction system 212 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 214 can determine a motion plan for the autonomous vehicle 202 based at least in part on the predicted one or more future locations for the object provided by the prediction system 212 and/or the state data for the object provided by the perception system 210. Stated differently, given information about the current locations of objects and/or predicted future locations of proximate objects, the motion planning system 214 can determine a motion plan for the autonomous vehicle 202 that best navigates the autonomous vehicle 202 relative to the objects at such locations.

As one example, in some implementations, the motion planning system 214 can determine a cost function for each of one or more candidate motion plans for the autonomous vehicle 202 based at least in part on the current locations and/or predicted future locations of the objects. For example, the cost function can describe a cost (e.g., over time) of adhering to a particular candidate motion plan. For example, the cost described by a cost function can increase when the autonomous vehicle 202 approaches a possible impact with another object and/or deviates from a preferred pathway (e.g., a preapproved pathway).

Thus, given information about the current locations and/or predicted future locations of objects, the motion planning system 214 can determine a cost of adhering to a particular candidate pathway. The motion planning system 214 can select or determine a motion plan for the autonomous vehicle 202 based at least in part on the cost function(s). For example, the candidate motion plan that minimizes the cost function can be selected or otherwise determined. The motion planning system 214 can provide the selected motion plan to a vehicle controller 216 that controls one or more vehicle controls 208 (e.g., actuators or other devices that control gas flow, acceleration, steering, braking, etc.) to execute the selected motion plan.

Each of the perception system 210, the prediction system 212, the motion planning system 214, and the vehicle controller 216 can include computer logic utilized to provide desired functionality. In some implementations, each of the perception system 210, the prediction system 212, the motion planning system 214, and the vehicle controller 216 can be implemented in hardware, firmware, and/or software controlling a general purpose processor. For example, in some implementations, each of the perception system 210, the prediction system 212, the motion planning system 214, and the vehicle controller 216 includes program files stored on a storage device, loaded into a memory, and executed by one or more processors. In other implementations, each of the perception system 210, the prediction system 212, the motion planning system 214, and the vehicle controller 216 includes one or more sets of computer-executable instructions that are stored in a tangible computer-readable storage medium such as RAM hard disk or optical or magnetic media.

Figure 3:
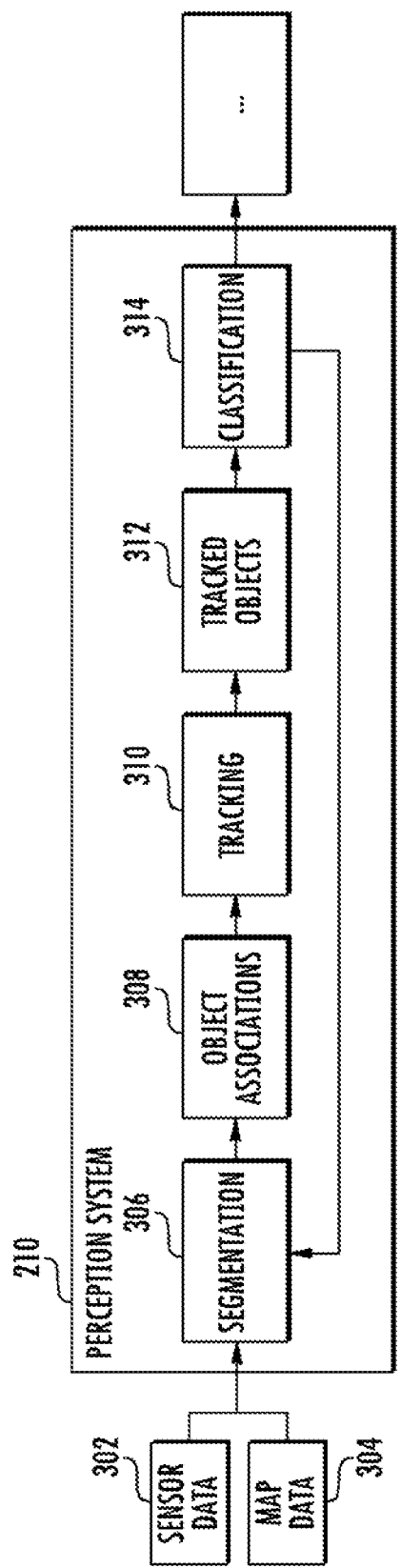
FIG. 3 depicts example aspects of an object detection pipeline according to example embodiments of the present disclosure.

FIG. 3 depicts a block diagram of a more particular features associated with an example perception system 210 according to example embodiments of the present disclosure. As discussed in regard to FIG. 2, a vehicle computing system 206 can include a perception system 210 that can identify one or more objects that are proximate to an autonomous vehicle 202. In some embodiments, the perception system 210 can include segmentation component 306, object associations component 308, tracking component 310, tracked objects component 312, and classification component 314. The perception system 210 can receive sensor data 302 (e.g., from one or more sensor(s) 204 of the autonomous vehicle 202) and map data 304 as input. The perception system 210 can use the sensor data 302 and the map data 304 in determining objects within the surrounding environment of the autonomous vehicle 202. In some embodiments, the perception system 210 iteratively processes the sensor data 302 to detect, track, and classify objects identified within the sensor data 302. In some examples, the map data 304 can help localize the sensor data to positional locations within a map data or other reference system.

Within the perception system 210, the segmentation component 306 can process the received sensor data 302 and map data 304 to determine potential objects within the surrounding environment, for example using one or more object detection systems. The object associations component 308 can receive data about the determined objects and analyze prior object instance data to determine a most likely association of each determined object with a prior object instance, or in some cases, determine if the potential object is a new object instance. The tracking component 310 can determine the current state of each object instance, for example, in terms of its current position, velocity, acceleration, heading, orientation, uncertainties, and/or the like. The tracked objects component 312 can receive data regarding the object instances and their associated state data and determine object instances to be tracked by the perception system 210. The classification component 314 can receive the data from tracked objects component 312 and classify each of the object instances. For example, classification component 314 can classify a tracked object as an object from a predetermined set of objects (e.g., a vehicle, bicycle, pedestrian, etc.). The perception system 210 can provide the object and state data for use by various other systems within the vehicle computing system 206, such as the prediction system 212 of FIG. 2.

Figure 4:
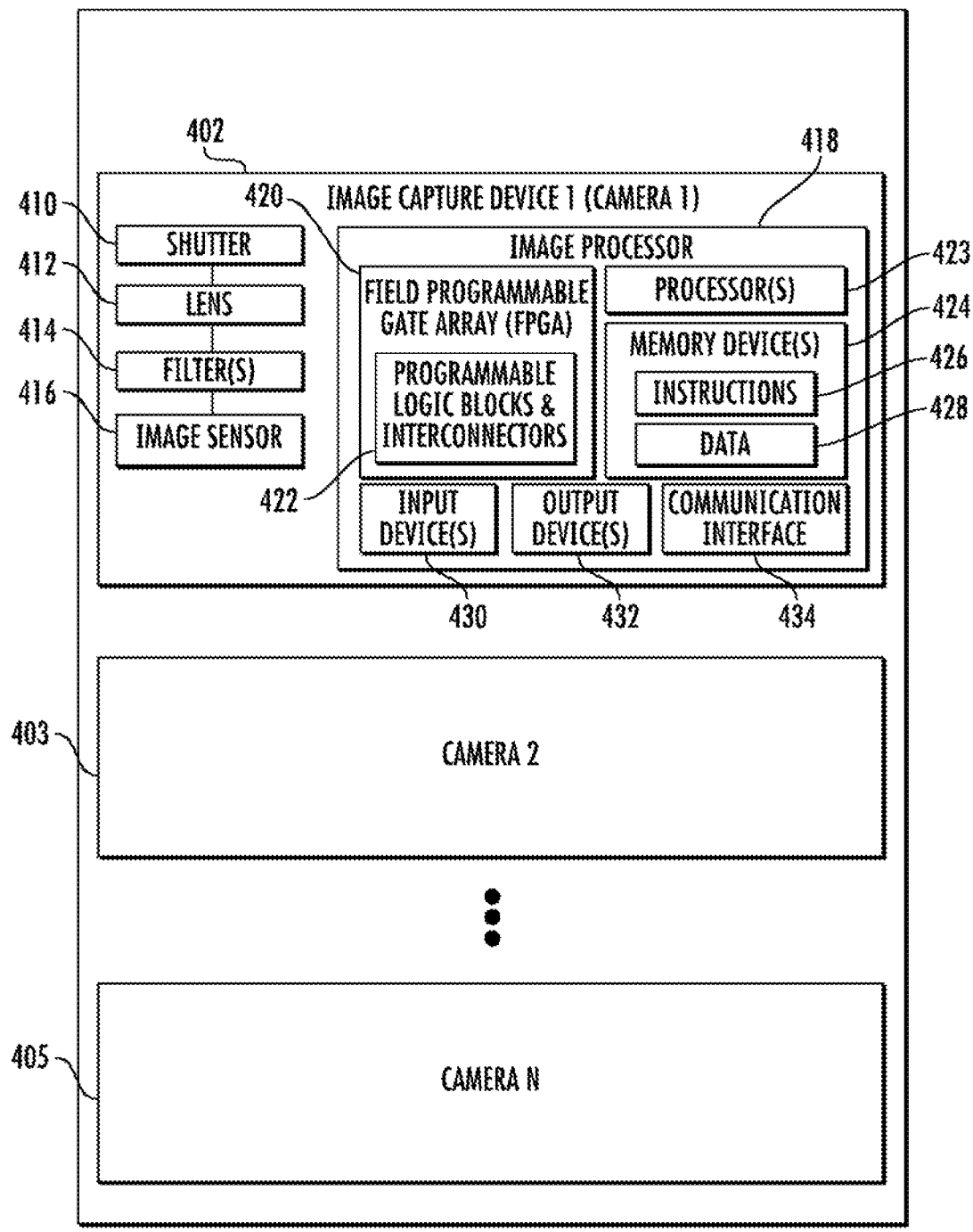
FIG. 4 depicts a block diagram of an example camera system according to example embodiments of the present disclosure.

FIG. 4 depicts a block diagram of a camera system according to example embodiments of the present disclosure. In particular, FIG. 4 depicts an example embodiment of camera(s) 226 of a sensor system, such as sensor system including sensors 204 of FIG. 2, whereby camera(s) 226 can generate image data for use by a vehicle computing system in an autonomous vehicle, such as vehicle computing system 206 of FIG. 2, as discussed above. In some implementations, camera(s) 226 include a plurality of camera devices (e.g., image capture devices), such as camera 402, camera 403, and camera 405. Although only the components of camera 402 are discussed herein in further detail, it should be appreciated that cameras 2, . . . , N (e.g., camera 403 and camera 405) can include similar components as camera 402. In some implementations, the autonomous vehicle sensor system, such as sensors 204 of FIG. 2, may include at least four cameras, at least five cameras, at least six cameras, or more or less cameras depending on the desired fields of view.

Camera 402 can include a shutter 410, one or more lenses 412, one or more filters 414, and an image sensor 416. Camera 402 can also have additional conventional camera components not illustrated in FIG. 4 as would be understood by one of ordinary skill in the art. When shutter 410 of camera 402 is controlled to an open position, incoming light passes through lens(es) 412 and filter(s) 414 before reaching image sensor 416. Lens(es) 412 can be positioned before, between and/or after shutter 410 to focus images captured by camera 402. Camera 402 can obtain raw image capture data in accordance with a variety of shutter exposure protocols (e.g., a global shutter exposure protocol or a rolling shutter exposure protocol) by which a shutter is controlled to expose image sensor 416 to incoming light. Filter(s) 414 can include, for example, an infrared (IR) filter, a neutral density (NR) filter, an ultraviolet (UV) filter, a color filter array, or other filter type.

In some examples, the image sensor 416 can be a charge-coupled device (CCD) sensor or a complementary metal-oxide-semiconductor (CMOS) sensor, although other cameras can also be employed. Image sensor 416 can include an array of sensor elements corresponding to unique image pixels that are configured to detect incoming light provided incident to a surface of image sensor 416. Each sensor element within image sensor 416 can detect incoming light by detecting the amount of light that falls thereon and converting the received amount of light into a corresponding electric signal. The more light detected at each pixel, the stronger the electric signal generated by the sensor element corresponding to that pixel. In some examples, each sensor element within image sensor 416 can include a photodiode and an amplifier along with additional integrated circuit components configured to generate the electric signal representative of an amount of captured light at each camera element. The electric signals detected at image sensor 416 provide raw image capture data at a plurality of pixels, each pixel corresponding to a corresponding sensor element within image sensor 416. Camera 402 can be configured to capture successive full image frames of raw image capture data in successive increments of time.

As illustrated in FIG. 4, camera 402 also can include one or more image processing devices (e.g., image processors) 418 coupled to image sensor 416. In some examples, the one or more image processors 418 can include a field-programmable gate array (FPGA) device 420 provided within the camera 402. In some implementations, FPGA device 420 can correspond to or otherwise include one or more aspects described relative to FPGA device 100 of FIG. 1.

FPGA device 420 can include a plurality of programmable logic blocks and interconnectors 422. Specific configurations of the plurality of programmable logic blocks and interconnectors 422 can be selectively controlled to process raw image capture data received from image sensor 416. One or more image data links can be provided to couple the one or more image processors 418 to image sensor 416. In some examples, each image data link can be a high speed data link that can relay relatively large amounts of image data while consuming a relatively low amount of power. In some examples, image data link(s) can operate using different signaling protocols, including but not limited to a Low-Voltage Differential Signaling (LVDS) protocol, a lower voltage sub-LVDS protocol, a Camera Serial Interface (CSI) protocol using D-PHY and/or M-PHY physical layers, or other suitable protocols and interface layers.

The one or more image processors 418 can include one or more processor(s) 423 along with one or more memory device(s) 424 that can collectively function as respective computing devices. The one or more processor(s) 423 can be any suitable processing device such as a microprocessor, microcontroller, integrated circuit, an application specific integrated circuit (ASIC), a digital signal processor (DSP), a field-programmable gate array (FPGA), logic device, one or more central processing units (CPUs), processing units performing other specialized calculations, etc. The one or more processor(s) 423 can be a single processor or a plurality of processors that are operatively and/or selectively connected.

The one or more memory device(s) 424 can include one or more non-transitory computer-readable storage media, such as RAM, ROM, EEPROM, EPROM, flash memory devices, magnetic disks, etc., and/or combinations thereof. The one or more memory device(s) 424 can store information that can be accessed by the one or more processor(s) 423. For instance, the one or more memory device(s) 424 can include computer-readable instructions 426 that can be executed by the one or more processor(s) 423. The instructions 426 can be software written in any suitable programming language, firmware implemented with various controllable logic devices, and/or can be implemented in hardware. Additionally, and/or alternatively, the instructions 426 can be executed in logically and/or virtually separate threads on processor(s) 423. The instructions 426 can be any set of instructions that when executed by the one or more processor(s) 423 cause the one or more processor(s) 423 to perform operations.

The one or more memory device(s) 424 can store data 428 that can be retrieved, manipulated, created, and/or stored by the one or more processor(s) 423. The data 428 can include, for instance, raw image capture data, digital image outputs, or other image-related data or parameters. The data 428 can be stored in one or more database(s). The one or more database(s) can be split up so that they can be provided in multiple locations.

Camera 402 can include a communication interface 434 used to communicate with one or more other component(s) of a sensor system or other systems of an autonomous vehicle, for example, a vehicle computing system such as vehicle computing system 206 of FIG. 2. The communication interface 434 can include any suitable components for interfacing with one or more communication channels, including for example, transmitters, receivers, ports, controllers, antennas, or other suitable hardware and/or software. A communication channel can be any type of communication channel, such one or more data bus(es) (e.g., controller area network (CAN)), an on-board diagnostics connector (e.g., OBD-II) and/or a combination of wired and/or wireless communication links for sending and/or receiving data, messages, signals, etc. among devices/systems. A communication channel can additionally or alternatively include one or more networks, such as a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the camera 402 and/or other local autonomous vehicle systems or associated server-based processing or control systems located remotely from an autonomous vehicle. The communication channel can include a direct connection between one or more components. In general, communication using communication channels and/or among one or more component(s) can be carried via communication interface 434 using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Camera 402 also can include one or more input devices 430 and/or one or more output devices 432. An input device 430 can include, for example, devices for receiving information from a user, such as a touch screen, touch pad, mouse, data entry keys, speakers, a microphone suitable for voice recognition, etc. An input device 430 can be used, for example, by a user or accessible computing device to select controllable inputs for operation of the camera 402 (e.g., shutter, ISO, white balance, focus, exposure, etc.) and or control of one or more parameters. An output device 432 can be used, for example, to provide digital image outputs to a vehicle operator. For example, an output device 432 can include a display device (e.g., display screen, CRT, LCD), which can include hardware for displaying an image or other communication to a user. Additionally, and/or alternatively, output device(s) can include an audio output device (e.g., speaker) and/or device for providing haptic feedback (e.g., vibration).

Figure 5:
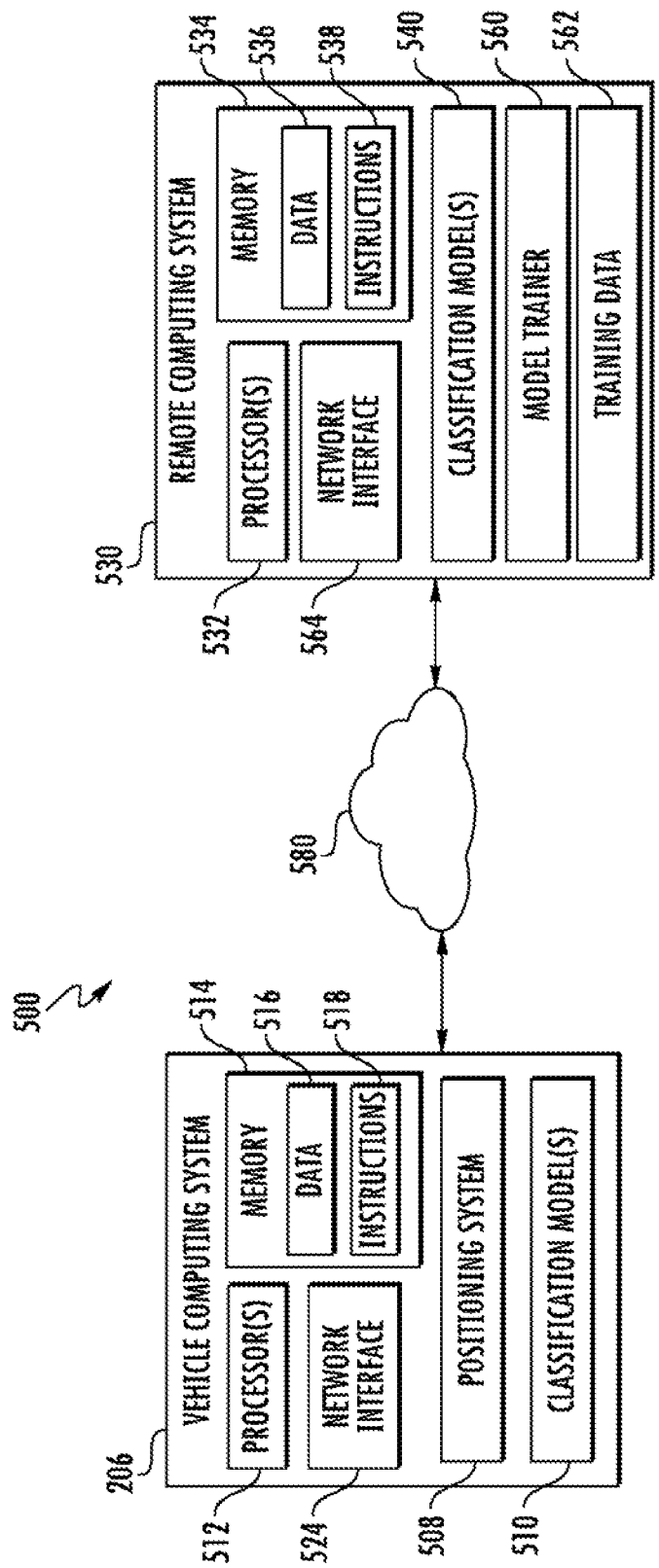
FIG. 5 depicts a block diagram of an example computing system according to example embodiments of the present disclosure.

FIG. 5 depicts a block diagram of an example computing system 500 according to example embodiments of the present disclosure. The example computing system 500 can include a vehicle computing system (e.g., vehicle computing system 206 of FIG. 2) and a remote computing system 530 that are communicatively coupled over a network 580. Remote computing system 530 can include one or more remote computing device(s) that are remote from the autonomous vehicle 202. The remote computing system 530 can be associated with a central operations system and/or an entity associated with the autonomous vehicle 202 such as, for example, a vehicle owner, vehicle manager, fleet operator, service provider, etc.

In some implementations, the vehicle computing system 206 can perform autonomous vehicle motion planning including object detection, tracking, and/or classification (e.g., making object class predictions and object location/orientation estimations as described herein). In some implementations, the vehicle computing system 206 can be included in an autonomous vehicle. For example, the vehicle computing system 206 can be on-board the autonomous vehicle. In other implementations, the vehicle computing system 206 is not located on-board the autonomous vehicle. For example, the vehicle computing system 206 can operate offline to perform object detection including making object class predictions and object location/orientation estimations. The vehicle computing system 206 can include one or more distinct physical computing devices.

The vehicle computing system 206 can include one or more computing devices embodied by one or more processors 512 and a memory 514. The one or more processors 512 can be any suitable processing device (e.g., a processor core, a microprocessor, an ASIC, a FPGA, a controller, a microcontroller, etc.) and can be one processor or a plurality of processors that are operatively connected. The memory 514 can include one or more non-transitory computer-readable storage media, such as RAM, ROM, EEPROM, EPROM, one or more memory devices, flash memory devices, etc., and combinations thereof.

The memory 514 can store information that can be accessed by the one or more processors 512. For instance, the memory 514 (e.g., one or more non-transitory computer-readable storage mediums, memory devices) can store data 516 that can be obtained, received, accessed, written, manipulated, created, and/or stored. The data 516 can include, for instance, ranging data obtained by LIDAR system 222 and/or RADAR system 224, image data obtained by camera(s) 226, data identifying detected and/or classified objects including current object states and predicted object locations and/or trajectories, motion plans, classification models, rules, etc. as described herein. In some implementations, the vehicle computing system 206 can obtain data from one or more memory device(s) that are remote from the vehicle computing system 206.

The memory 514 can also store computer-readable instructions 518 that can be executed by the one or more processors 512. The instructions 518 can be software written in any suitable programming language or can be implemented in hardware. Additionally, or alternatively, the instructions 518 can be executed in logically and/or virtually separate threads on processor(s) 512.

For example, the memory 514 can store instructions 518 that when executed by the one or more processors 512 cause the one or more processors 512 to perform any of the operations and/or functions described herein, including, for example, operations 702-714 of FIG.

In some implementations, the vehicle computing system 206 can further include a positioning system 508. The positioning system 508 can determine a current position of the autonomous vehicle 202. The positioning system 508 can be any device or circuitry for analyzing the position of the autonomous vehicle 202. For example, the positioning system 508 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the autonomous vehicle 202 can be used by various systems of the vehicle computing system 206.

According to an aspect of the present disclosure, the vehicle computing system 206 can store or include one or more classification models 510. As examples, the classification model(s) 510 can be or can otherwise include various models trained by supervised learning and/or machine learning such as, for example, classification model 130 of FIG. 1. Classification model 510 can include one or more neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

In some implementations, the vehicle computing system 206 can receive the one or more classification models 510 from the remote computing system 530 over network 580 and can store the one or more classification models 910 in the memory 514. The vehicle computing system 206 can then use or otherwise implement the one or more classification models 510 (e.g., by processor(s) 512). In particular, the vehicle computing system 206 can implement the classification model(s) 510 to perform object detection including making object class predictions. For example, in some implementations, the vehicle computing system 206 can employ the classification model(s) 510 by inputting one or more image regions into the classification model(s) 510 and receiving an output of the classification model 510 including a determination of whether the image region does or does not include a detected object, as well as an optional classification of detected objects and/or confidence score indicating the likelihood of accuracy for a detection determination and/or object class prediction.

The remote computing system 530 can include one or more computing devices embodied by one or more processors 532 and a memory 534. The one or more processors 532 can be any suitable processing device (e.g., a processor core, a microprocessor, an ASIC, a FPGA, a controller, a microcontroller, etc.) and can be one processor or a plurality of processors that are operatively connected. The memory 534 can include one or more non-transitory computer-readable storage media, such as RAM, ROM, EEPROM, EPROM, one or more memory devices, flash memory devices, etc., and combinations thereof.

The memory 534 can store information that can be accessed by the one or more processors 532. For instance, the memory 534 (e.g., one or more non-transitory computer-readable storage mediums, memory devices) can store data 536 that can be obtained, received, accessed, written, manipulated, created, and/or stored. The data 536 can include, for instance, ranging data, image data, data identifying detected and/or classified objects including current object states and predicted object locations and/or trajectories, motion plans, machine-learned models, rules, etc. as described herein. In some implementations, the remote computing system 530 can obtain data from one or more memory device(s) that are remote from the remote computing system 530.

The memory 534 can also store computer-readable instructions 538 that can be executed by the one or more processors 532. The instructions 538 can be software written in any suitable programming language or can be implemented in hardware. Additionally, or alternatively, the instructions 538 can be executed in logically and/or virtually separate threads on processor(s) 532.

Figure 11:
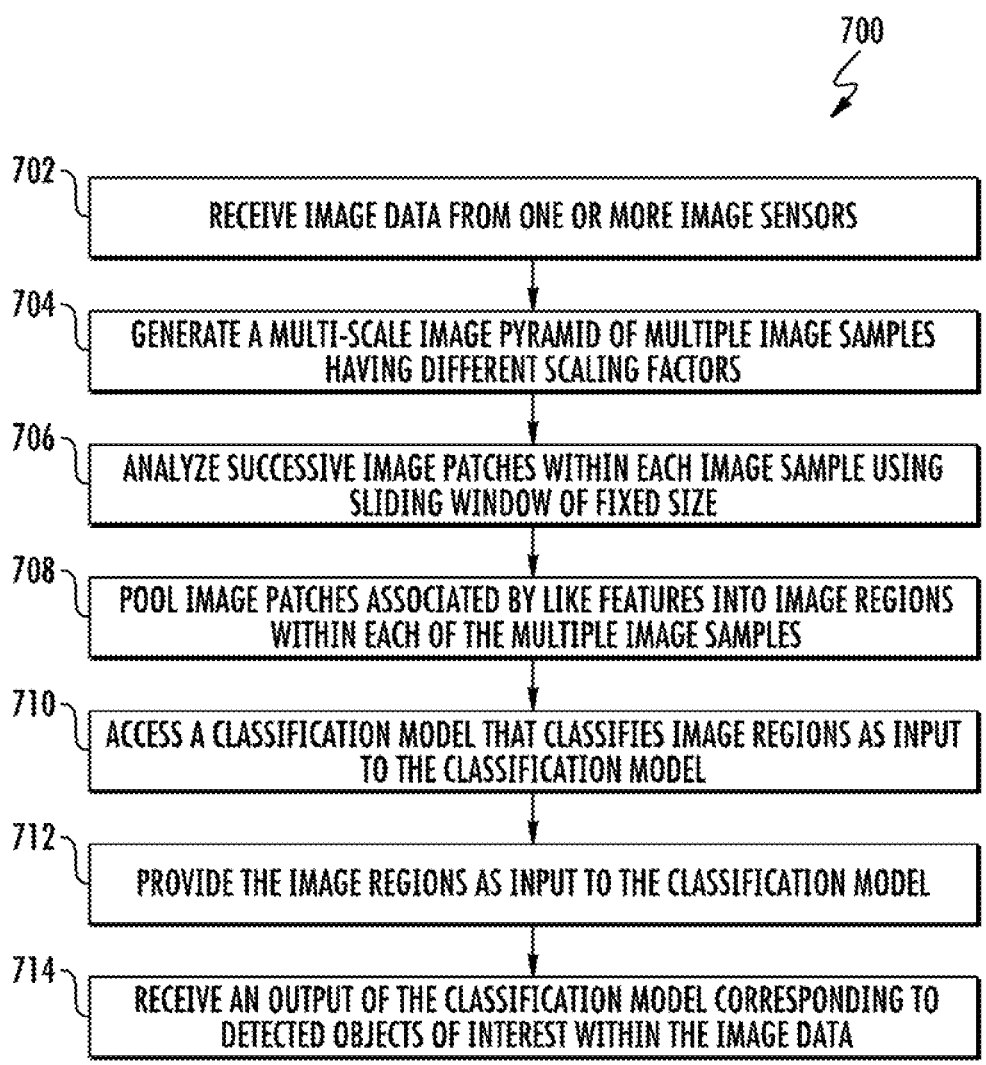
FIG. 11 depicts a flow diagram of an example method for detecting objects of interest according to example embodiments of the present disclosure.

For example, the memory 534 can store instructions 538 that when executed by the one or more processors 532 cause the one or more processors 532 to perform any of the operations and/or functions described herein, including, for example, operations 702-714 of FIG. 11.

In some implementations, the remote computing system 530 includes one or more server computing devices. If the remote computing system 530 includes multiple server computing devices, such server computing devices can operate according to various computing architectures, including, for example, sequential computing architectures, parallel computing architectures, or some combination thereof.

In addition or alternatively to the classification model(s) 510 at the vehicle computing system 206, the remote computing system 530 can include one or more classification models 540. As examples, the classification model(s) 540 can be or can otherwise include various model(s) trained by supervised learning and/or machine learning such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

As an example, the remote computing system 530 can communicate with the vehicle computing system 206 according to a client-server relationship. For example, the remote computing system 530 can implement the classification model(s) 540 to provide a web service to the vehicle computing system 206. For example, the web service can provide an autonomous vehicle motion planning service.

Thus, classification model(s) 510 can be located and used at the vehicle computing system 206 and/or classification model(s) 540 can be located and used at the remote computing system 530.

In some implementations, the remote computing system 530 and/or the vehicle computing system 206 can train the classification model(s) 510 and/or 540 through use of a model trainer 560. The model trainer 560 can train the classification model(s) 510 and/or 540 using one or more training or learning algorithms. One example training technique is backwards propagation of errors. In some implementations, the model trainer 560 can perform supervised training techniques using a set of labeled training data. In other implementations, the model trainer 560 can perform unsupervised training techniques using a set of unlabeled training data. The model trainer 560 can perform a number of generalization techniques to improve the generalization capability of the models being trained. Generalization techniques include weight decays, dropouts, pruning, or other techniques.

In particular, the model trainer 560 can train a classification model 510 or 540 based on a set of training data 562. The training data 562 can include, for example, a plurality of sets of ground truth data, each set of ground truth data including a first portion and a second portion. The first portion of ground truth data can include an example set of one or more image regions, while the second portion of ground truth data can correspond to a class prediction (e.g., an indication that an image region includes or does not include one or more classes of objects) that is manually and/or automatically labeled as correct or incorrect.

The model trainer 560 can train a classification model 510 or 540, for example, by using one or more sets of ground truth data in the set of training data 562. For each set of ground truth data including a first portion (e.g., an image region) and second portion (e.g., a class prediction), model trainer 560 can: provide the first portion as input into the classification model 510 or 540; receive at least one class prediction as an output of the classification model 510 or 540; and evaluate an objective function that describes a difference between the at least one class prediction received as an output of the classification model(s) 510 or 540 and the second portion of the set of ground truth data. The model trainer 560 can train the classification model(s) 510 or 540 based at least in part on the objective function. As one example, in some implementations, the objective function can be backpropagated through a machine-learned classification model 510 or 540 to train the classification model 510 or 540. In such fashion, the classification model(s) 510 and/or 540 can be trained to provide a correct class prediction on the receipt of one or more image regions generated camera image data. The model trainer 560 can be implemented in hardware, firmware, and/or software controlling one or more processors.

The vehicle computing system 206 can also include a network interface 524 used to communicate with one or more systems or devices, including systems or devices that are remotely located from the vehicle computing system 206. The network interface 524 can include any circuits, components, software, etc. for communicating with one or more networks (e.g., 580). In some implementations, the network interface 524 can include, for example, one or more of a communications controller, receiver, transceiver, transmitter, port, conductors, software, and/or hardware for communicating data. Similarly, the remote computing system 530 can include a network interface 564.

The network(s) 580 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof and can include any number of wired or wireless links. Communication over the network(s) 580 can be accomplished, for instance, via a network interface using any type of protocol, protection scheme, encoding, format, packaging, etc.

FIG. 5 illustrates one example computing system 500 that can be used to implement the present disclosure. Other computing systems can be used as well. For example, in some implementations, the vehicle computing system 206 can include the model trainer 560 and the training data 562. In such implementations, the classification model(s) 510 can be both trained and used locally at the vehicle computing system 206. As another example, in some implementations, the vehicle computing system 206 is not connected to other computing systems.

In addition, components illustrated and/or discussed as being included in one of the computing systems 206 or 930 can instead be included in another of the computing systems 206 or 930. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Figure 6:
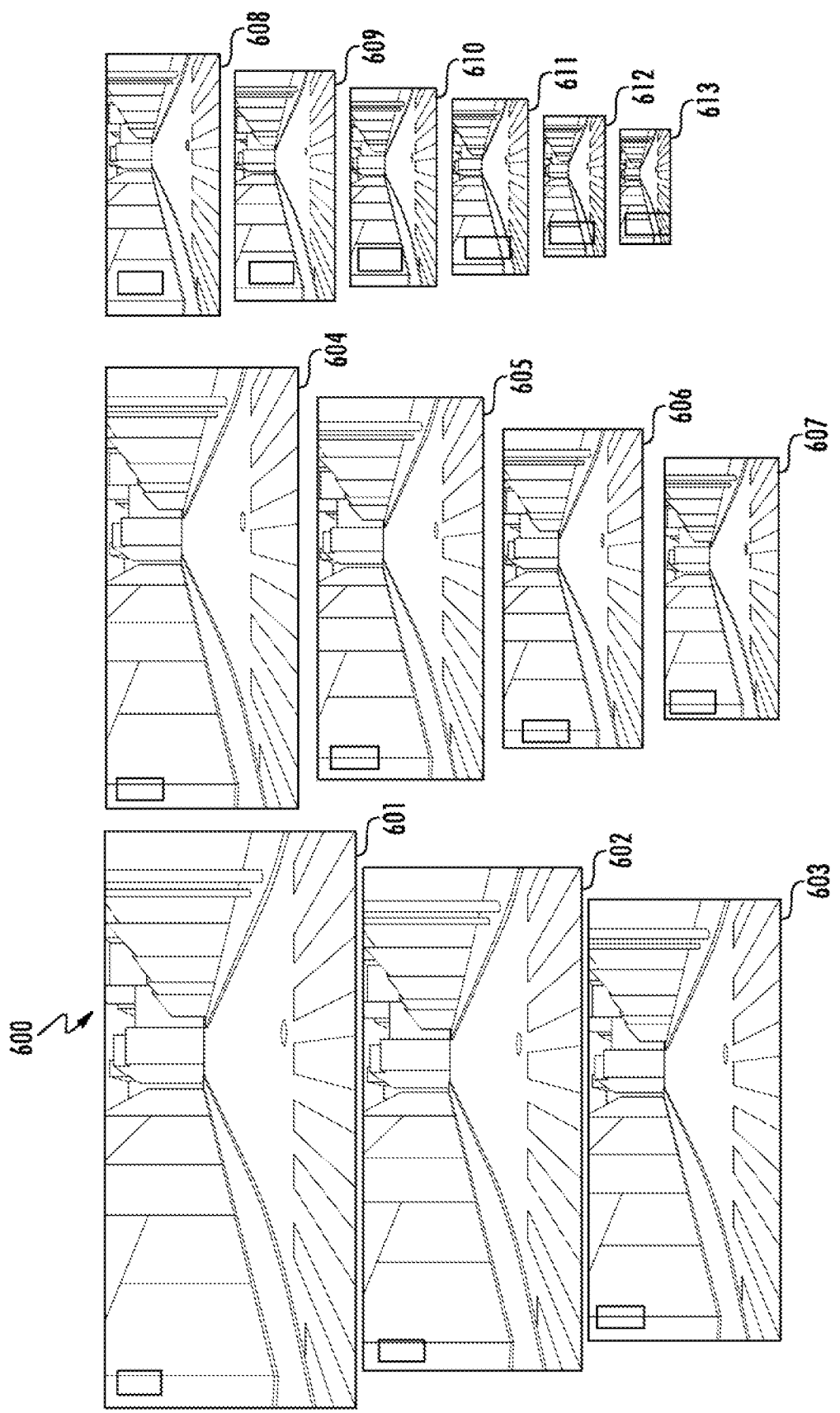
FIG. 6 depicts an example multi-scale image pyramid according to example embodiments of the present disclosure.

FIG. 6 depicts an example multi-scale image pyramid 600 according to example embodiments of the present disclosure. For example, a multi-scale image pyramid 600 can include multiple image samples (e.g., image samples 601-613) that are created by resizing image data (e.g., image data 102) into multiple image samples having different sampling ratios. Resizing to create a multi-scale image pyramid can be implemented, for example, by resizing component 117 of FPGA device 100 in FIG. 1. In some implementations, for example, image resizing can include downsampling the image data 102 into multiple image samples forming the multi-scale image pyramid 600. The multi-scale image pyramid 600 can include image data that is translated into multiple image samples 601-613, each having a different scaling factor. In some implementations, the multi-scale image pyramid 600 can be characterized by a number of octaves (e.g., powers of two) and a number of scales per octave. Although FIG. 6 depicts multi-scale image pyramid 600 as including 13 different image samples, it should be appreciated that any number of image samples can be generated in accordance with embodiments of the disclosed technology. In some implementations, for example, a multi-scale image pyramid is generated having 3 octaves and 3 scales for a total of $2^3*3=24$ scales.

FIGS. 7-10 depict exemplary aspects of sliding window image analysis according to example embodiments of the present disclosure. For example, FIGS. 7-10 depict successive iterations 640, 650, 660 and 670 of analyzing an example image sample 642 using a sliding window 644 having a fixed predetermined size. Image sample 642 can correspond, for example, to one of the image samples created when generating a multi-scale image pyramid such as depicted in FIG. 6.

Figure 7:
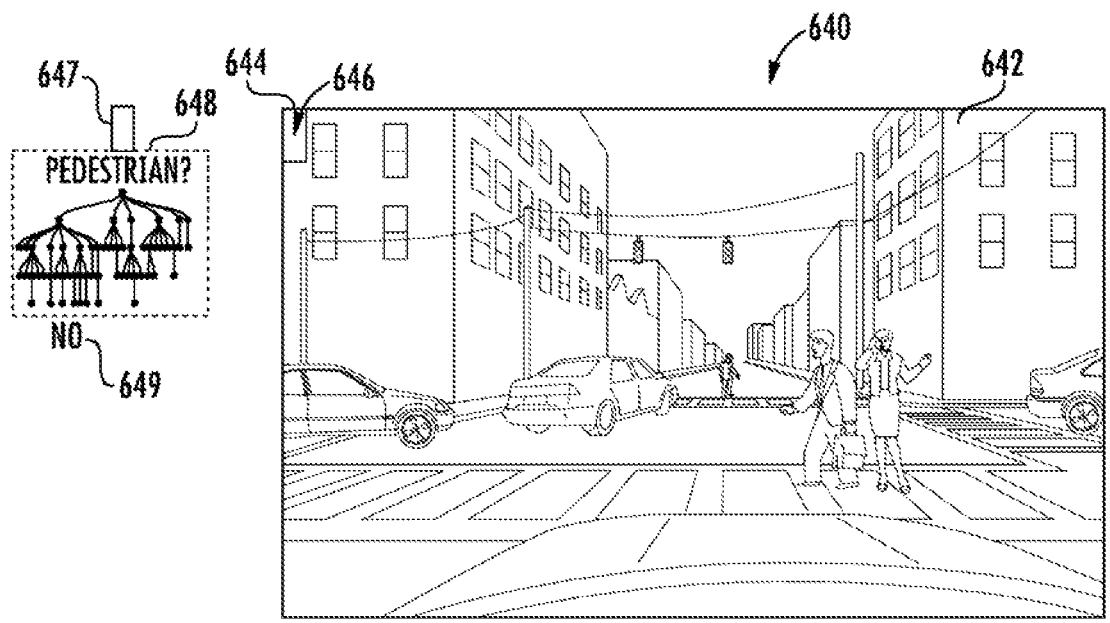
FIG. 7 depicts a first example aspect of sliding window image analysis according to example embodiments of the present disclosure.

In first iteration 640 of FIG. 7, sliding window 644 is positioned at a first position 646 within image sample 642. In some implementations, first position 646 can correspond to a start position for analyzing successive patches within the image sample 642. Although first position 646 is depicted in the upper left corner of image sample 642, it should be appreciated that a start position (e.g., first position 646) can correspond to one of the other corners of image sample 642 and/or another predetermined location within image sample 642 including a predetermined location relative to a subset of each image sample 642. An image patch 647 can be identified within sliding window 644 at first position 646 and provided as an input to a classification model 648. Classification model 648 can correspond, for example, to classification model 130 of FIG. 1 or classification model 510 or 540 of FIG. 5. The classification model 648 depicted in FIGS. 7-10 can have been trained to output a pedestrian classification prediction that determines whether image patch 647 includes or does not include a pedestrian. When image patch 647 is provided as input to classification model 648, a "NO" output 649 can be received indicating that image patch 647 does not include a pedestrian. Although FIGS. 7-10 depict an example classification prediction for pedestrians, other classifications can additionally or alternatively be determined.

Figure 8:
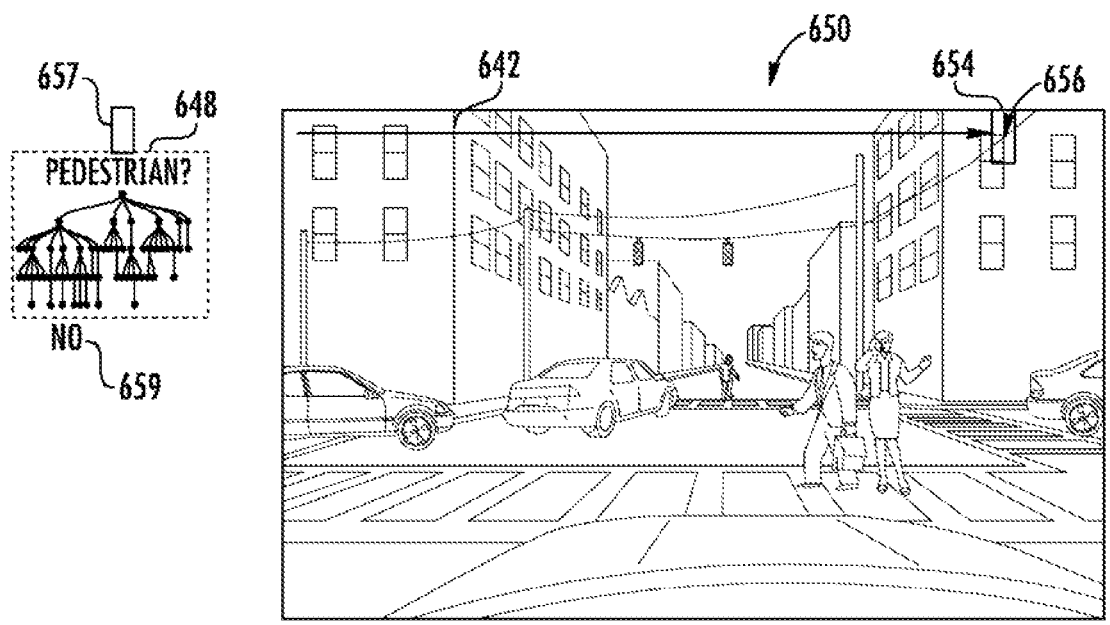
FIG. 8 depicts a second example aspect of sliding window image analysis according to example embodiments of the present disclosure.

In second iteration 650 of FIG. 8, sliding window 644 is positioned at a second position 656 within image sample 642. In some implementations, second position 656 can correspond to a position translated in a given direction relative to a start position (e.g., first position 646 of FIG. 1). For instance, second position 656 corresponds to a position translated horizontally relative to first position 646. It should be appreciated that multiple positions of sliding window 644 can be implemented between the first position 646 of FIG. 7 and the second position 656 of FIG. 8. As such, although the position of sliding window 644 in FIGS. 7 and 8 are described as a first position 646 and second position 656, the first and second positions 646, 656 are not necessarily consecutive.

Referring still to FIG. 8, an image patch 657 can be identified within sliding window 644 at second position 656 and provided as an input to classification model 648. When image patch 657 is provided as input to classification model 648, a "NO" output 659 can be received indicating that image patch 657 does not include a pedestrian. Successive image patches between image patch 647 and image patch 657 as sliding window 644 transitions from the first position 646 depicted in FIG. 7 to the second position 656 depicted in FIG. 8 can also be provided as input to classification model 648, with corresponding outputs received therefrom.

Figure 9:
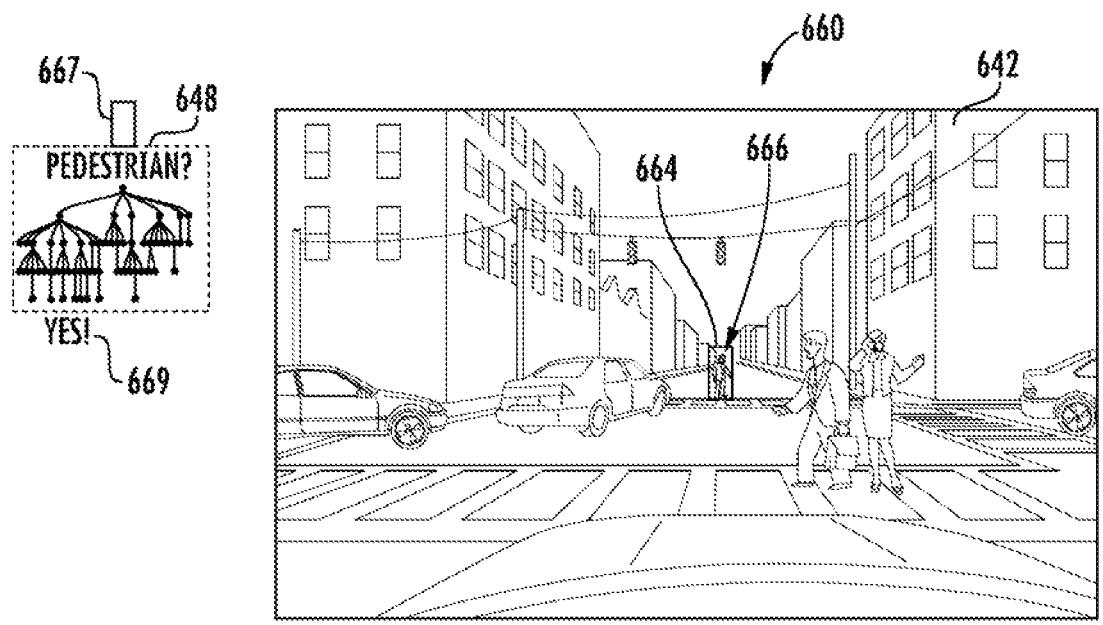
FIG. 9 depicts a third example aspect of sliding window image analysis according to example embodiments of the present disclosure.

In third iteration 660 of FIG. 9, sliding window 644 is positioned at a third position 666 within image sample 642. It should be appreciated that multiple positions of sliding window 644 can be implemented between the second position 656 of FIG. 8 and the third position 666 of FIG. 9. As such, although the position of sliding window 644 in FIGS. 8 and 9 are described as a second position 656 and third position 666, the second and third positions 656, 666 are not necessarily consecutive. An image patch 667 can be identified within sliding window 644 at third position 666 and provided as an input to classification model 648. When image patch 667 is provided as input to classification model 648, a "YES" output 669 can be received indicating that image patch 667 does include a pedestrian. Successive image patches between image patch 657 and image patch 667 as sliding window 644 transitions from the second position 656 depicted in FIG. 8 to the third position 666 depicted in FIG. 9 can also be provided as input to classification model 648, with corresponding outputs received therefrom.

Figure 10:
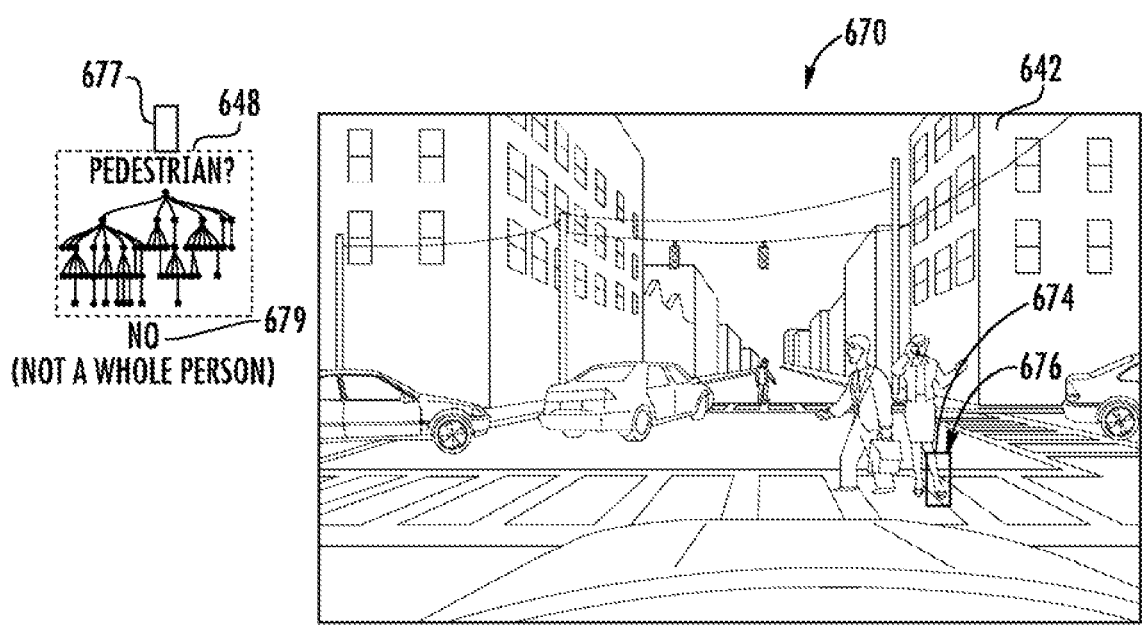
FIG. 10 depicts a fourth example aspect of sliding window image analysis according to example embodiments of the present disclosure.

In fourth iteration 670 of FIG. 10, sliding window 644 is positioned at a fourth position 676 within image sample 642. It should be appreciated that multiple positions of sliding window 644 can be implemented between the third position 666 of FIG. 9 and the fourth position 676 of FIG. 10. As such, although the position of sliding window 644 in FIGS. 9 and 10 are described as a third position 666 and fourth position 676, the third and fourth positions 666, 676 are not necessarily consecutive. An image patch 677 can be identified within sliding window 644 at fourth position 676 and provided as an input to classification model 648. In addition, successive image patches between image patch 667 and image patch 677 as sliding window 644 transitions from the third position 666 depicted in FIG. 9 to the fourth position 676 depicted in FIG. 10 can also be provided as input to classification model 648, with corresponding outputs received therefrom.

Referring still to FIG. 10, when image patch 677 is provided as input to classification model 648, a "NO" output 679 can be received indicating that image patch 677 does not include a pedestrian. Although image patch 677 includes a portion of a pedestrian (e.g., a leg), the pedestrian may not be recognized by classification model 648 until an image patch containing a larger portion or entirety of the pedestrian is provided as input to classification model 648. This is why multiple image samples having different scales are analyzed using a sliding window 644 of fixed size. In this manner, objects only partially captured within sliding window 644 in some image samples can be fully captured within sliding window 644 in one or more other image samples.

FIG. 11 depicts a flow chart diagram of an example method 700 of detecting objects of interest according to example embodiments of the present disclosure. One or more portion(s) of the method 700 can be implemented by one or more programmable circuit devices, such as FPGA device 100 of FIG. 1, or FPGA device 420 of FIG. 4. Moreover, one or more portion(s) of the method 700 can be implemented as an algorithm on the hardware components of the device(s) described herein (e.g., as in FIGS. 1-5).

FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. For example, method 700 can additionally or alternatively include one or more functions implemented by FPGA device 100 of FIG. 1, including but not limited to bit conversion, de-Bayering, gamma correction, color space conversion, rectification, anti-aliasing, resizing, Sobel filtering, angle binning, convolution filtering, pooling, and classification.

At (702), method 700 can include receiving, by one or more programmable circuit devices, image data from one or more cameras. The image data received at (702) can correspond, for example, to image data 102 described with reference to FIG. 1 or raw image capture data received from one or more cameras (e.g., camera(s) 226 of FIG. 2 or cameras 402, 403, 405 of FIG. 4).

At (704), method 700 can include generating, by the one or more programmable circuit devices, a multi-scale image pyramid of multiple image samples having different scaling factors. Generating a multi-scale image pyramid at (704) can be implemented, for example, by the resizing component 117 of FPGA device 100, such as illustrated in and described with reference to FIG. 1. An example image pyramid of multiple image samples as generated at (704) is depicted in FIG. 6.

At (706), method 700 can include analyzing, by the one or more programmable circuit devices, successive image patches within each of the multiple image samples using a sliding window of fixed size. At (708), method 700 can include pooling, by the one or more programmable circuit devices, image patches associated by like features into image regions within each of the multiple image samples. Analyzing successive image patches within each of the multiple image samples at (706) and pooling image patches associated by like features into image regions at (708) can be implemented, for example, by the pooling component 124 of FPGA device 100, such as illustrated and described with reference to FIG. 1.

At (710), method 700 can include accessing, by the one or more programmable circuit devices, a classification model that classifies image regions as including or not including detected objects. In some implementations, the classification model accessed at (710) can have been trained to receive one or more image regions and in response to receipt of the one or more image regions provide a class prediction output. In some implementations, the classification model accessed at (710) can correspond, for example, to classification model 130 of FIG. 1, classification model 510 of FIG. 5 or classification model 540 of FIG. 5.

At (712), method 700 can include providing, by the one or more programmable circuit devices, the image regions from (708) as input to the classification model accessed at (710). In some implementations, multiple image regions can be provided as an input vector to the classification model accessed at (710). In some implementations, multiple image regions or vectors of image regions can be provided at (712) to multiple instances of a classification model such that parallel classifications can be made at or near a same point in time. In some implementations, one or more image regions can be provided at (712) to one or more instances of a classification model accessed at (710) in an iterative fashion such that outputs from the classification model can be iteratively produced/received at (714).

At (714), method 700 can include producing/receiving, by the one or more programmable circuit devices, an output of the classification model corresponding to detected objects of interest within the image data. For example, in some implementations, an output of the classification model received at (714) can include a class prediction output. A class prediction output can correspond, for example, to a determination of whether an image region includes or does not include one or more classes of objects. For example, the class prediction output can correspond to a classification selected from a predetermined set of classifications (e.g., pedestrian, vehicle, bicycle, no object). In some implementations, the class prediction output can also include a probability score associated with each classification indicating a likelihood that the determined classification is accurate.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A method of detecting objects of interest, comprising:
   receiving, by one or more programmable circuit devices, image data from one or more cameras;
   generating, by the one or more programmable circuit devices, based on the image data from the one or more cameras, a multi-scale image pyramid of multiple image samples;
   analyzing, by the one or more programmable circuit devices, image patches within each of the multiple image samples;
   pooling, by the one or more programmable circuit devices, image patches associated by features into image regions within each of the multiple image samples wherein the features comprise edge portions, and wherein each edge portion is assigned to at least one of a plurality of different bins depending on an angle classification for that edge portion;
   accessing, by the one or more programmable circuit devices, a classification model that classifies image regions;
   providing, by the one or more programmable circuit devices, the image regions as input to the classification model; and
   receiving, by the one or more programmable circuit devices, an output of the classification model corresponding to detected objects of interest within the image regions.

2. The method of claim 1, wherein the classification model includes a decision tree classifier and wherein the output of the classification model provides a classification of each detected object of interest as one or more of a pedestrian, a vehicle, or a bicycle and a probability score associated with each classification.

3. The method of claim 1, comprising generating, by the one or more programmable circuit devices, one or more channel images from the image data, each channel image corresponding to a feature map that maps a patch of one or more input pixels from the image data to an output pixel within the channel image.

4. The method of claim 1, comprising determining, by the one or more programmable circuit devices, a histogram descriptive of the plurality of different bins.

5. The method of claim 4, wherein the histogram comprises a histogram of oriented gradients for the edge portions.

6. The method of claim 1, wherein the plurality of different bins are defined to have different sizes based on an amount of the image data in each of the multiple image samples such that bin sizes are smaller for the image samples having a greater amount of the image data.

7. The method of claim 1, comprising converting, by the one or more programmable circuit devices, intermediate stages of the image data from the one or more cameras from a floating point representation to a fixed point integer-based representation.

8. The method of claim 1, comprising converting, by the one or more programmable circuit devices, the image data from the one or more cameras into a multi-parameter representation including values corresponding to an image hue parameter, an image saturation parameter, and an image greyscale parameter.

9. The method of claim 1, comprising converting, by the one or more programmable circuit devices, the image data from a representation having multiple color components to a greyscale representation.

10. An image processing system, comprising:
    one or more cameras configured to obtain image data;
    one or more memory devices configured to store a classification model that classifies image features within the image data as including or not including detected objects; and
    one or more image processing pipelines comprising a plurality of logic blocks and interconnectors programmed to:
      receive the image data from the one or more cameras;
      generate a multi-scale image pyramid of multiple image samples;
      analyze image patches within each of the multiple image samples;
      pool image patches associated by features into image regions within each of the multiple image samples, wherein the features comprise edge portions, and wherein each edge portion is assigned to at least one of a plurality of different bins depending on an angle classification for that edge portion;
      access the classification model that classifies image regions;
      provide the image regions as input to the classification model; and
      receive an output of the classification model corresponding to detected objects of interest within the image regions.

11. The image processing system of claim 10, wherein the classification model includes a decision tree classifier and wherein the output of the classification model provides a classification of each detected object of interest as one or more of a pedestrian, a vehicle, or a bicycle and a probability score associated with each classification.

12. The image processing system of claim 10, wherein the one or more image processing pipelines include a plurality of logic blocks and interconnectors programmed to generate one or more channel images from the image data, each channel image corresponding to a feature map that maps a patch of one or more input pixels from the image data to an output pixel within the channel image.

13. The image processing system of claim 10, wherein the one or more image processing pipelines include a plurality of logic blocks and interconnectors programmed to determine a histogram descriptive of the plurality of different bins.

14. The image processing system of claim 13, wherein the histogram comprises a histogram of oriented gradients for the edge portions.

15. The image processing system of claim 10, wherein the plurality of different bins are defined to have different sizes based on an amount of the image data in each of the multiple image samples such that bin sizes are smaller for the image samples having a greater amount of the image data.

16. The image processing system of claim 10, wherein the one or more image processing pipelines include a plurality of logic blocks and interconnectors programmed to convert intermediate stages of the image data from the one or more cameras from a floating point representation to a fixed point integer-based representation.

17. The image processing system of claim 10, wherein the one or more image processing pipelines include a plurality of logic blocks and interconnectors programmed to convert the image data from the one or more cameras into a multi-parameter representation including values corresponding to an image hue parameter, an image saturation parameter, and an image greyscale parameter.

18. A vehicle control system, comprising:
one or more cameras configured to obtain image data within an environment proximate to a vehicle;
a field programmable gate array (FPGA) device coupled to one or more cameras, the FPGA device configured to implement one or more image processing pipelines for image transformation and object detection, the one or more image processing pipelines including a plurality of logic blocks and interconnectors programmed to:
receive the image data from the one or more cameras;
generate a multi-scale image pyramid of multiple image samples;
analyze image patches within each of the multiple image samples;
pool image patches associated by features into image regions within each of the multiple image samples, wherein the features comprise edge portions, and wherein each edge portion is assigned to at least one of a plurality of different bins depending on an angle classification for that edge portion; and
detect one or more objects of interest within the image regions; and
one or more computing devices configured to receive an output from the FPGA device and to characterize the objects of interest.

* * * * *